(12) United States Patent
Bildhauer et al.

(10) Patent No.: US 10,305,752 B2
(45) Date of Patent: May 28, 2019

(54) AUTOMATICALLY ORCHESTRATING THE COMPLIANCE OF CLOUD SERVICES TO SELECTED STANDARDS AND POLICIES

(71) Applicant: INTERNATIONAL BUSINESS MACHINES CORPORATION, Armonk, NY (US)

(72) Inventors: Georg Bildhauer, Nufringen (DE); Werner Staub, Rottenburg (DE); Torsten Teich, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 15/680,298

(22) Filed: Aug. 18, 2017

(65) Prior Publication Data
US 2019/0058640 A1 Feb. 21, 2019

(51) Int. Cl.
*G06F 15/173* (2006.01)
*H04L 12/24* (2006.01)
*G06Q 30/00* (2012.01)
*H04L 29/08* (2006.01)

(52) U.S. Cl.
CPC ....... *H04L 41/5025* (2013.01); *G06Q 30/018* (2013.01); *H04L 41/5032* (2013.01); *H04L 41/5038* (2013.01); *H04L 67/10* (2013.01)

(58) Field of Classification Search
CPC .............................. H04L 67/10; G06Q 30/018
See application file for complete search history.

(56) References Cited

U.S. PATENT DOCUMENTS

| 8,910,278 | B2 | 12/2014 | Davne et al. |
| 9,110,976 | B2 | 8/2015 | Bolgert et al. |
| 9,117,027 | B2 | 8/2015 | Dayal et al. |
| 9,124,493 | B2 | 9/2015 | Kacherov et al. |
| 9,210,141 | B2 | 12/2015 | Anderson et al. |

(Continued)

FOREIGN PATENT DOCUMENTS

EP 2608124 A1 6/2013

OTHER PUBLICATIONS

Mell et al., "The NIST Definition of Cloud Computing," U.S. Department of Commerce, National Institute of Standards and Technology, Sep. 2011, p. 1-7, Special Publication 800-145.

(Continued)

*Primary Examiner* — Jonathan A Bui
(74) *Attorney, Agent, or Firm* — Dmitry Paskalov

(57) ABSTRACT

The present embodiment may include a computing system that may extract a plurality of metadata from a service contract (human readable document) that was signed between the cloud infrastructure provider and a service owner before the service is deployed on the service delivery system of the cloud infrastructure provider. The present embodiment may compile the plurality of metadata into a control component that is an executable program that may be compiled with the service and adopted for auditing and enforcing the service contract of the service. The present embodiment may cause the service owner to compile the service with the control component, where the control component enabling auditing and enforcing the service contract signed for the service and monitors the service at runtime for compliance with the service contract.

20 Claims, 18 Drawing Sheets

(56) References Cited

U.S. PATENT DOCUMENTS

| | | | |
|---|---|---|---|
| 2004/0172638 A1* | 9/2004 | Larus | G06F 8/31 |
| | | | 719/328 |
| 2006/0229935 A1 | 10/2006 | Subbloie et al. | |
| 2008/0148346 A1* | 6/2008 | Gill | H04L 63/1408 |
| | | | 726/1 |
| 2012/0072985 A1 | 3/2012 | Davne et al. | |
| 2012/0179746 A1 | 7/2012 | Bolgert et al. | |
| 2012/0291009 A1* | 11/2012 | Khare | G06F 8/38 |
| | | | 717/109 |
| 2013/0073994 A1* | 3/2013 | Liao | G06F 3/048 |
| | | | 715/762 |
| 2014/0282439 A1* | 9/2014 | Kannan | G06F 8/76 |
| | | | 717/140 |
| 2017/0142157 A1 | 5/2017 | Cao et al. | |
| 2018/0322286 A1* | 11/2018 | Diehl | G06F 21/566 |

OTHER PUBLICATIONS

Sun et al., "Service Level Agreement (SLA) Assurance for Cloud Services: A Survey from a Transactional Risk Perspective", Proceeding MoMM '12 Proceedings of the 10th International Conference on Advances in Mobile Computing & Multimedia, Bali, Indonesia, Dec. 3-5, 2012, pp. 263-266.

Theilmann et al., "A Reference Architecutre for Multi-Level SLA Management", Journal of Internet Engineering, vol. 4, No. 1, Dec. 2010, pp. 289-298.

* cited by examiner

```
{
  " manifest_version ":"1.0.0",
  " service_name ":"Your Service Name",
  " service_component ":"Your Component Name",
  " component_sourcecode_repository":"<<GitHub Repository URL>>",
  " deployment_artefact_repository":"<<GitHub Repository URL>>", " support_policy ":"<<Your Support Escalation Policy URL>>",
  " support_email ":"<<Your Team-E mail Address>>",
  " customer_ticket_system_url ":"<<Your Customer Ticket System URL>>", " security_status_url ":"<<URL for your Security Posture Status Page>>",
  " static_sec_analyze_url ":"<<URL for the current results of your static analysis security scan>>",
  " runbook_repo_url ":"<<URL For your Runbook repository for this component>>",
  " continuity_plan_url ":"<<URL For your Business Continuity Plan for this component or the whole service>>", " development_agility_posture ":"<<URL to the build agility posture document>>",
  " validation_agility_posture ":"<<URL to the validation agility posture document>>",
  " currency_posture ":"<<URL to the deployment agility posture document>>", " sla_target ":"<<URL to the service level agreement definition>>",
  " metrics_target ":"<<URL to the build/deploy/runtime metrics(min&max values)>>"
}
```

AUTOMATICALLY ORCHESTRATING THE COMPLIANCE OF CLOUD SERVICES TO SELECTED STANDARDS AND POLICIES

BACKGROUND

The present invention relates, generally, to the field of computing, and more particularly to a method for managing the compliance of cloud services.

The method for managing the compliance of cloud services is designed for enhancing a service delivery system with a service contract and associated control points which audit and enforce that the services comply with a set of defined policies.

Cloud computing is a form of Internet-based computing that provides shared computer processing resources and data to computers and other devices on demand. Cloud computing is a model for enabling ubiquitous, on-demand access to a shared pool of configurable computing resources (e.g., computer networks, servers, storage, applications and services), which may be rapidly provisioned and released with minimal management effort.

Cloud computing has become a significant shift for Information Technology (IT) companies. It replaces the classical data center approach and is being widely adopted by IT companies. Classical IT data centers were dominated by monolithic, middleware-based software from a single vendor whereas, in the modern cloud computing world, such as hybrid cloud computing, service-oriented architectures are implemented by integrating macro and micro services from different vendors, running on hybrid, dedicated or shared infrastructure, on and off premises of the cloud infrastructure provider.

A hybrid cloud environment is, typically, a cloud computing environment that uses a combination of on-premises, private cloud and third-party, public cloud services by synthesizing between the two platforms. The synthesizing is defined as allowing workloads to move between private and public clouds as computing needs and costs change. The hybrid cloud solutions give businesses greater flexibility and more data deployment options.

SUMMARY

According to one embodiment, a method, computer system, and computer program product for enhancing a service delivery system of a cloud infrastructure provider with a compliance management system is provided. The present embodiment may include a computing system that may extract a plurality of metadata from a service contract (human readable document) that was signed between the cloud infrastructure provider and a service owner before the service is deployed on the service delivery system of the cloud infrastructure provider. The present embodiment may compile the plurality of metadata into a control component that is an executable program that may be compiled with the service and adopted for auditing and enforcing the service contract of the service. The present embodiment may cause the service owner to compile the service with the control component, where the control component enabling auditing and enforcing the service contract signed for the service and monitors the service at runtime for compliance with the service contract.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 9 illustrates a data structure of a Service Contract Manifest, according to at least one embodiment;

DETAILED DESCRIPTION

Figure 1:
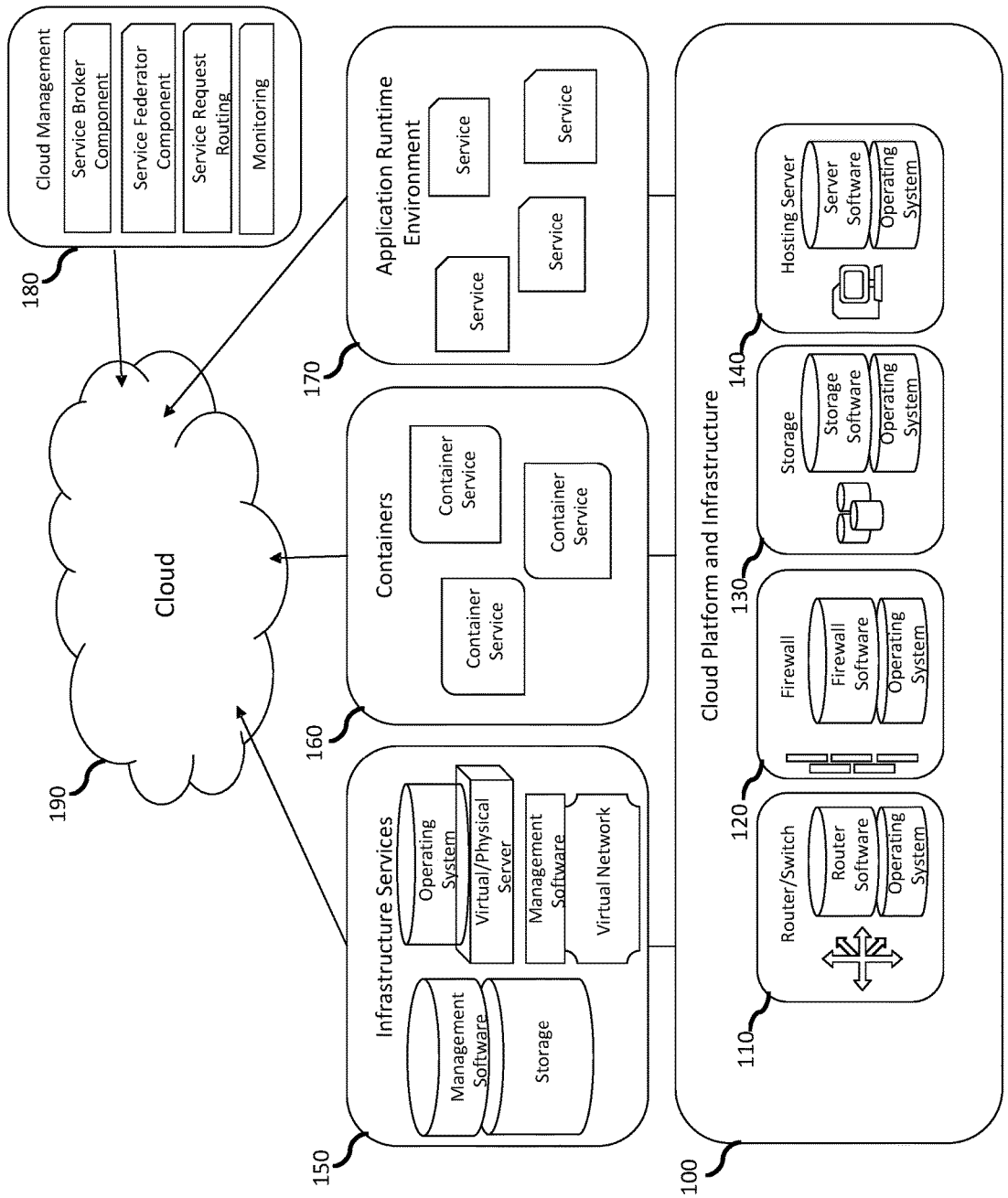
FIG. 1 illustrates a block diagram with the components of a service delivery infrastructure according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a method for managing the compliance of cloud services. The following described exemplary embodiments provide a system, method, and program product to, among other things, manage the compliance of cloud services for enhancement of a service delivery system with a service contract and associated control points which audit and enforce the compliance of the services to a set of defined policies. Therefore, the present embodiment has the capacity to improve the technical field of managing and enforcing the compliance of the deployed cloud services to the policies of cloud infrastructure provider by implementing a service contract that is in human-readable language that may be amended and then automatically translated by a control point component software (that may be executed in various stages of the lifecycle of the service), to a source code that may enforce the compliance of the deployed cloud services to the policies of cloud infrastructure provider and may be integrated and compiled with the service.

A service contract may denote a contractual agreement between the operators of the service delivery system and the provider of a particular service which is to be installed (deployed) and run on the service delivery system with the objective to mutually agree upon a set of rules, requirements and obligations under which the service owner is allowed to run his service on the target runtime.

The service delivery system may be a cloud system (cloud computing system) adapted for a delivery of a computer-based service, e.g., a calculation, storing data, performing a transaction, executing a computerized process, or performing an archive process. Such services may be delivered by different and/or changing resources.

As previously described, cloud computing has become a significant shift for Information Technology (IT) companies. It replaces the classical data center approach and is being widely adopted by IT companies. Classical IT data centers were dominated by monolithic, middleware-based software from single vendor whereas in the modern cloud computing world, such as hybrid cloud computing, service-oriented architectures are implemented by integrating macro and micro services from different vendors, running on hybrid, dedicated or shared infrastructure, on and off premises of the cloud infrastructure provider.

The wide variety of service owners makes it very difficult to determine and enforce compliance to common standards and best practices as well as compliance to the policies of the consumer. As such, it may be advantageous to, among other things, implement a method that manages the compliance of services to defined requirements that may be orchestrated (defined, determined and enforced).

According to one embodiment, a method for enhancing a service delivery system with a compliance management system may be provided. The compliance management system may implement a service contract which is mutually agreed upon by at least two parties, such as the owner of the service delivery system, a cloud infrastructure provider and a service owner. Each service, which is to be installed and run on the service delivery system, may need to be put under the regime of the service contract to make sure it fulfills the requirements of the service contract in terms of compliance, currency, security, safety, operability, and serviceability. Therefore, the service contract may be implemented through a control point component software of the cloud infrastructure provider, such as a component that a cloud infrastructure provider provides to the service owner, and by executing the control point component at various stages of the lifecycle of the service under the service contract regime. The method may further comprise a service contract manifest, which may be an electronic document that serves as an amendment to the service contract and documents each IT discipline to make it in the compliance with the service (i.e. the requirements and constraints of the service contract are implemented by the associated service).

The method may further include providing an initial service contract manifest to the service owner by the cloud infrastructure provider. Furthermore, the manifest that may contain a standardized instruction set to map the requirements and obligations of the service contract to policies and fulfillment parameters as defined by the cloud infrastructure provider.

In addition, the method may include enhancing, by the service owner, the service contract manifest with human readable information about the service's build and test infrastructure, source code repositories, information about the service owner and the service owner's operational and support systems as well as operational policies.

The method may further include providing the control point component to the service owner in the form of source code by means of a source code repository, which the service owner may consume at build time of the service, so that the control point component becomes an integral part of the packaged service deployment artefact, where the artefact may be an executable file or library that is installed on the service delivery system. Furthermore, the service contract manifest may be maintained by the service owner and stored in the source code repository of the service component, and the service contract manifest may also become an integral part of the packaged service deployment artefact. The method may further include an automatic update to the service contract manifest by each one of the service partners.

According to another embodiment, a method of transforming the human-readable information of the service contract manifest into machine-readable parameters and machine-executable code may be provided, where the machine-readable parameters are evaluated throughout the lifetime of the service and the machine-executable code invoked at various times throughout the lifecycle of said service.

According to another embodiment, a method of supervising the service by the service owner and the service delivery system provider may be provided while the service is built, tested, installed on the service delivery system, executed by the service delivery system, and uninstalled from the service delivery system, where the supervising may include registering the service contract manifest which is integrated into the control point component as a part of a service registry service. The supervising may also include sending, by the control point component, runtime data during the lifetime of the service to a compliance registry service in order to fulfill the terms and requirements of the service contract. The supervising furthermore may include monitoring, by a reporting and incident management service of the service delivery system owner (a cloud infrastructure provider) the compliance registry service and the service registry service and taking actions which are defined in the service contract manifest in case a non-compliance of the service with service contract obligations is detected.

According to a further embodiment, the control point component may send the service contract manifest information using the machine executable code that was generated out of the service manifest itself to a service registry and may update the information stored in the service registry at various times throughout the lifecycle of the service.

Furthermore, the control point component may send reports, metrics and health data of the associated service by using the machine executable code which was generated out of the service manifest itself to a compliance registry and update the reports, metrics and health data stored in the compliance registry at various times throughout the lifecycle of the service. One preferred embodiment of said compliance registry may be a central registry service, and another preferred embodiment of the compliance registry may be a compliance messaging service with which data exchange is performed through a publish-subscribe method.

By using the compliance messaging service according to one of the embodiments, multiple investigator services may subscribe for the reports, metrics and health data and may examine and verify the compliance of the services to required standards by analyzing the data contained in the reports and metrics.

One implementation of the investigator services may be an IBM® Watson® ((IBM and all IBM-based trademarks and logos are trademarks or registered trademarks of International Business Machines Corporation and/or its affiliates)) service, which may use cognitive algorithms and techniques to monitor said services, judge events of temporary non-compliance and to predict possible behaviors of said services and generate and send hints to the owners of the services to improve the quality of said service.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to create a model based on historical user information and meeting information that is capable of automatically modifying the contents of a computer display screen shared during a screen sharing session.

Referring to FIG. 1, exemplary components of a service delivery infrastructure according to at least one embodiment are depicted. Typically, Cloud 190 may incorporate a service delivery infrastructure that is interconnected via a network, and includes Cloud Platform and Infrastructure 100 on which higher level services, managed by different vendors run, such as Infrastructure Services 150, Containers 160, Application Runtime Environment 170, and Cloud Management 180.

Cloud Platform and Infrastructure 100 may include router/switch platform 110, firewall infrastructure 120, storage infrastructure 130, and hosting server infrastructure 140. Any platform of the Cloud Platform and Infrastructure 100 may include an independent networking devices, operating systems and appropriate platform software. For example, storage infrastructure 130 may include an operating system, storage software and physical storage.

Cloud Platform and Infrastructure 100 may include one or more of a server, a laptop computer, netbook computer, personal computer (PC), a desktop computer, or any programmable electronic device or any network of programmable electronic devices capable of hosting and running Infrastructure Services 150, Containers 160, Application Runtime Environment 170, and Cloud Management 180. As will be discussed with reference to FIG. 15, the Cloud Platform and Infrastructure 100 may include internal components 1502b and external components 1504b, respectively. The Cloud Platform and Infrastructure 100 may also operate in a cloud computing service model, such as Software as a Service (SaaS), Platform as a Service (PaaS), or Infrastructure as a Service (IaaS). The Cloud Platform and Infrastructure 100 may also be located in a cloud computing deployment model, such as a private cloud, community cloud, public cloud, or hybrid cloud.

Typically, Cloud Platform and Infrastructure 100 operates a higher level services that configured to be available for consumers of Cloud 190. Types of services may be Infrastructure Services 150, Container Services 160 and Application Runtime Environment 170. Infrastructure Services 150 enables controlling of the Cloud Platform and Infrastructure 100 services by the consumers. Container Services 160 and Application Runtimes 170 may be configured to run and operate hosting server 140. Cloud Management 180 components are configured to operate, administer, maintain, and monitor cloud services and infrastructure components.

The network may include various types of communication networks, such as a wide area network (WAN), local area network (LAN), a telecommunication network, a wireless network, a public switched network and/or a satellite network. The network may include connections, such as wire, wireless communication links, or fiber optic cables.

It may be appreciated that FIG. 1 provides only an illustration of one implementation and does not imply any limitations with regard to the environments in which different embodiments may be implemented. Many modifications to the depicted environments may be made based on design and implementation requirements.

Figure 2:
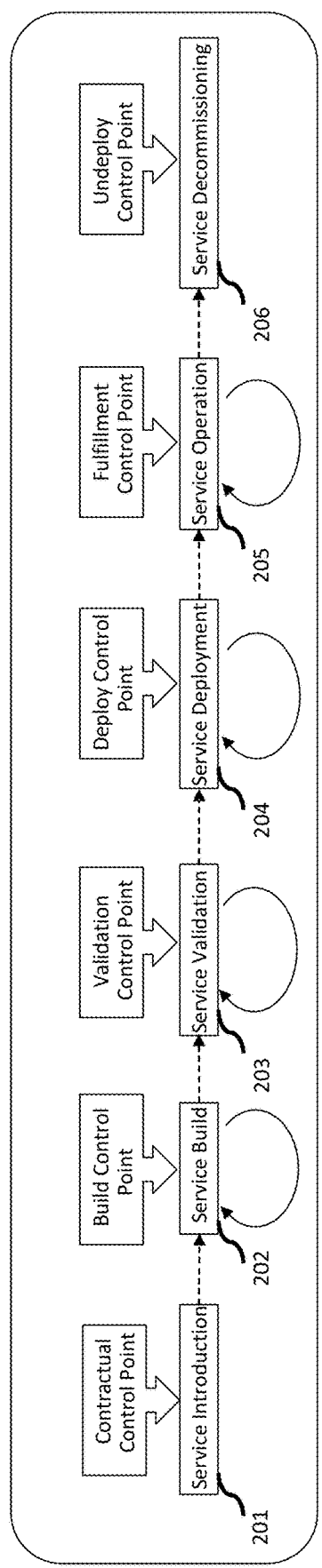
FIG. 2 illustrates a diagram of the control points which constitute and implement the inventive methods and their relationship to the lifecycle of a service according to at least one embodiment.

Referring to FIG. 2, an exemplary diagram of the control points which constitute and implement the inventive methods and their relationship to the lifecycle of a service according to at least one embodiment are depicted. A control point may be a point in the lifecycle of each service when the service has to execute certain tasks using the Control Point Component software (i.e. Service Library) as provided (injected) by the cloud infrastructure provider in order to fulfill the service contract.

A Control Point Component may be a software component that is provided by the cloud infrastructure provider. The Control Point Component may offer an interface consisting of a set of methods and functions to be executed at each of the Control Points of the Service Contract. As services that are running in a cloud infrastructure are not homogeneous and different in many aspects (e.g. base operating system, version of operating system, additional software packages installed etc.) it may be advantageous not to deliver a compiled and linked code, but to compile and link the Control Point Component code on the service side based on a minimum set of assumptions for the environment a service is built and running instead.

The cloud infrastructure provider may use more than one Control Point in order to execute actions to maintain and manage the services running in the cloud infrastructure in a consistent way. The service owner must include the Control Point Component into the development and deployment lifecycle of his service as part of the Service Contract. The cloud infrastructure provider then may adapt and change these management actions injected into the service at any time while the changes are transparent for the service owner.

According to at least one embodiment, the lifecycle of a service may include Service Introduction 201, Service Build 202, Service Validation 203, Service Deployment 204, Service Operation 205, and Service Decommissioning 206.

Service Introduction 201 may be a mutual agreement between a service owner and a cloud infrastructure provider. According to at least one embodiment, Service Introduction 201 may be a phase of the Service Contract Lifecycle that determines the mutual agreement between the service owner and the cloud infrastructure provider, ensuring the service will adhere to the Service Contract by execution of a Contractual Control Point. The Contractual Control Point may include actions to be executed by a service when the contract between the service owner and the cloud infrastructure provider is finalized.

Figure 4:
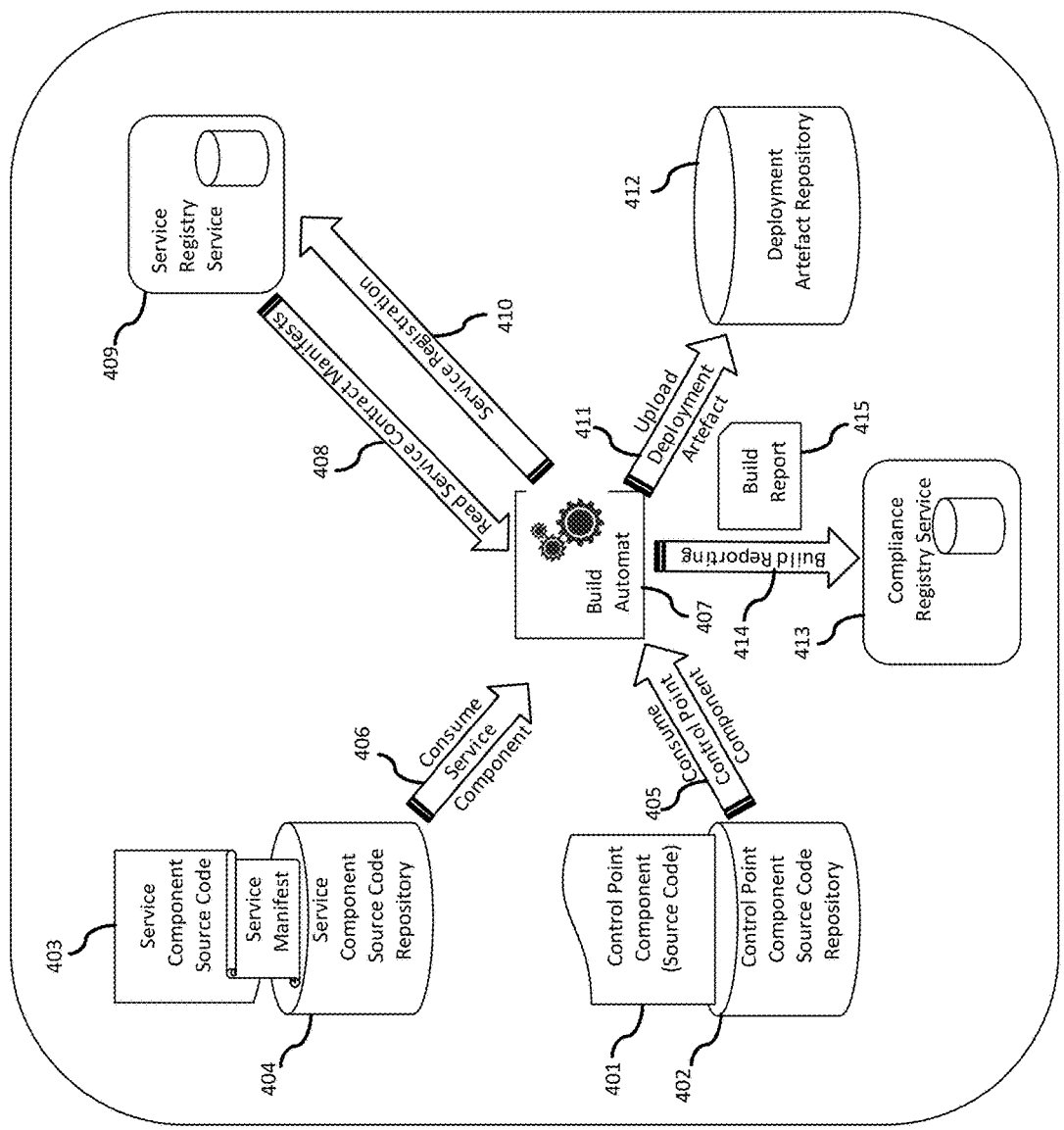
FIG. 4 illustrates a block diagram of the Build Control Point in terms of entities involved in the operation, and a sequence of actions in a typical execution of a control point according to at least one embodiment.

Service Build 202 may be a phase when a service owner consumes during the development phase a Control Point Component which the cloud infrastructure provider provides and executes corresponding steps according to a Build Control Point. The Build Control Point may describe the actions to be executed by a service as injected by the cloud infrastructure provider during a compilation of a service so that the service is ready to be deployed to the cloud infrastructure, as depicted in FIG. 4.

Service Validation 203 may be a phase to validate the compliance of a service with the obligations of the Service Contract by executing a Validation Control Point. The Validation Control Point may describe the actions to be executed by a service owner as injected by the cloud infrastructure provider when the service is tested and validated against the Service Contract obligations, before it is deployed to the cloud infrastructure.

Figure 5:
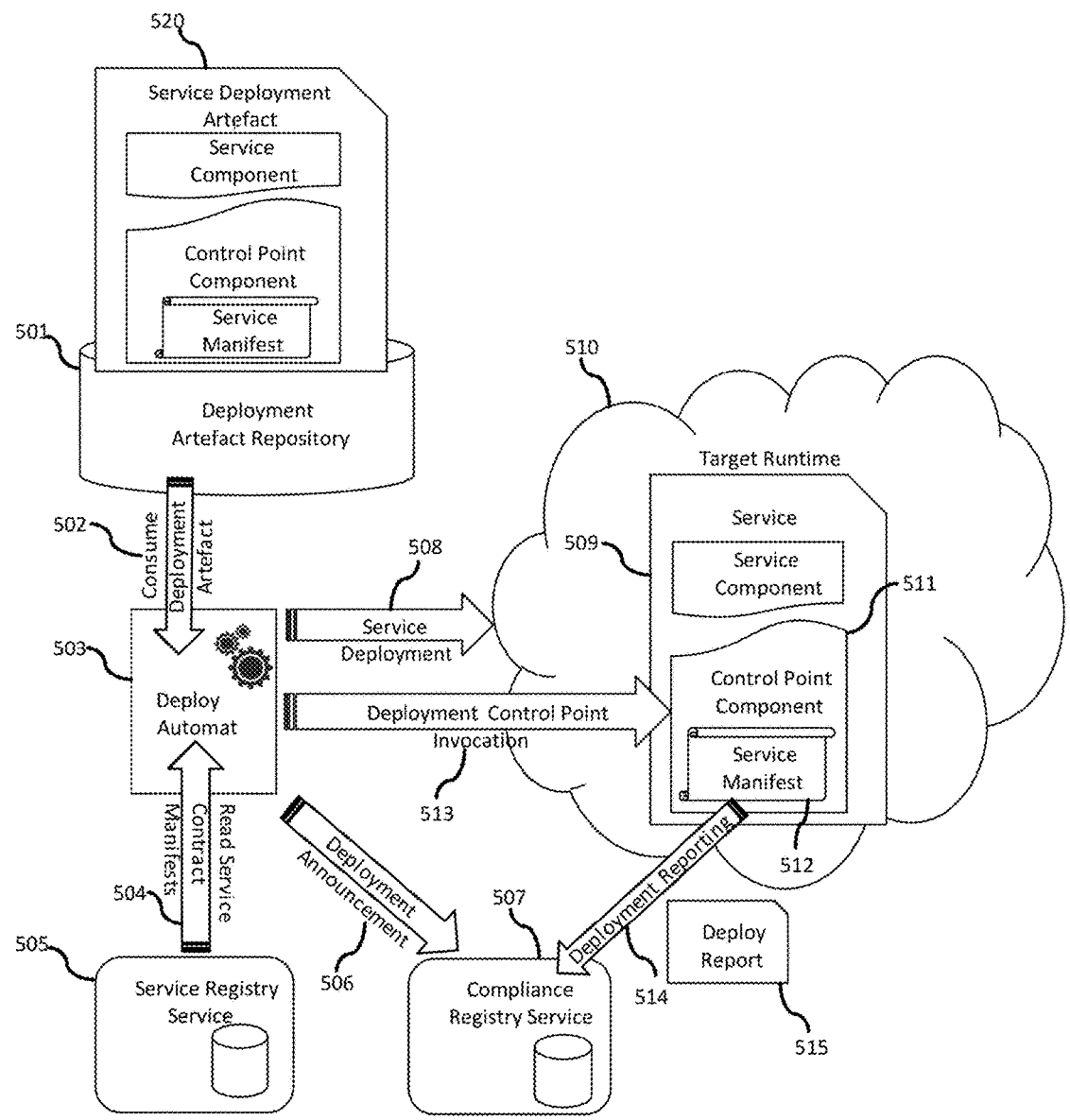
FIG. 5 illustrates a block diagram of the Deploy Control Point in terms of entities involved in the operation, and a sequence of actions in an execution of the control point according to at least one embodiment.

Service Deployment 204 may be a phase during each deployment when the mentioned Control Point Component executes steps of a Deploy Control Point. The Deploy Control Point may describe the actions to be executed by a service owner as injected by the cloud infrastructure provider when the service is deployed into the cloud infrastructure, as depicted in FIG. 5.

Figure 6:
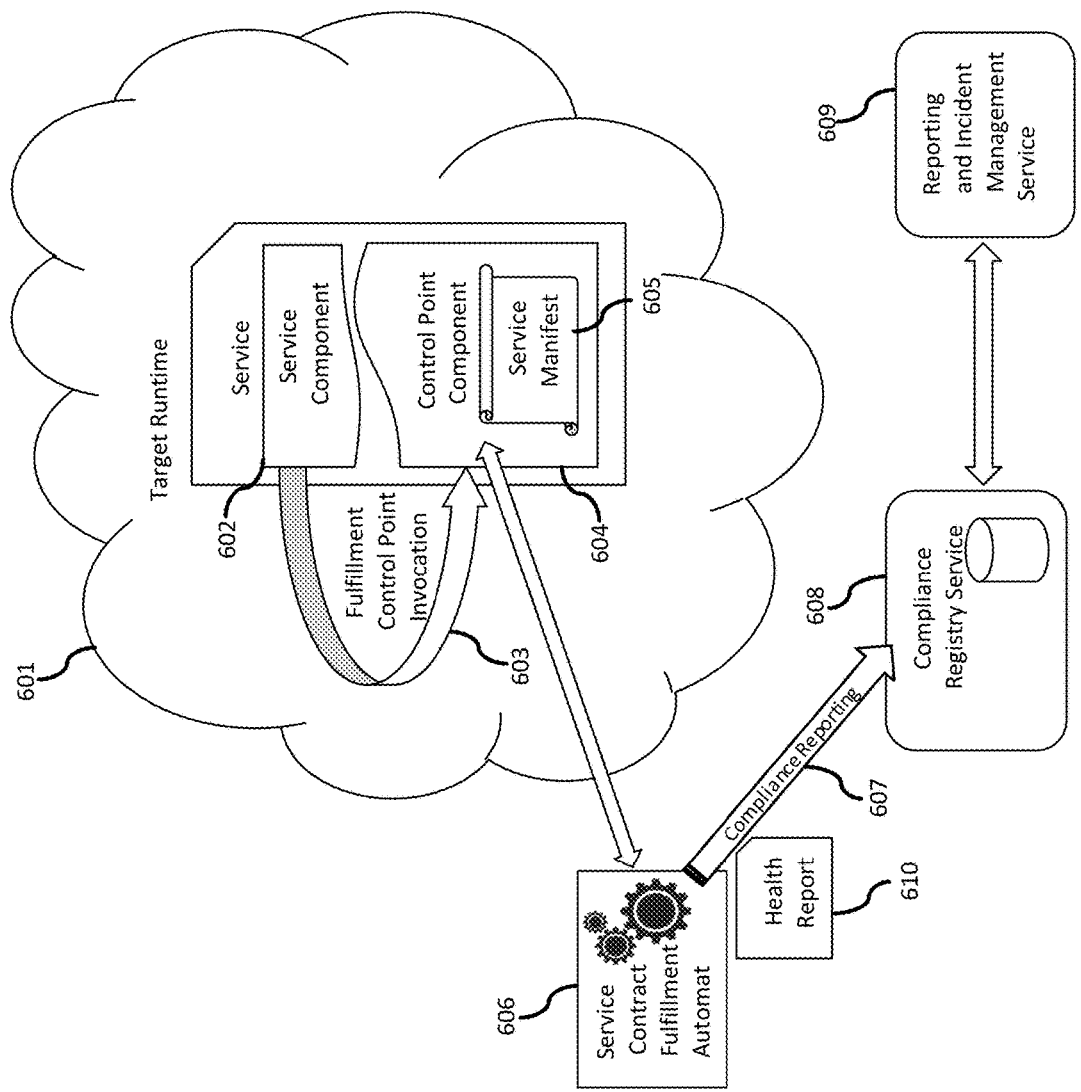
FIG. 6 illustrates a block diagram of the Fulfillment Control Point in terms of entities involved in the operation, and a sequence of actions in an execution of the Service installed and running on the Target Runtime, according to at least one embodiment.

Service Operation 205 may be a phase at runtime to implement actions defined in the Fulfillment Control Point. The Fulfillment Control Point may describe the actions to be executed by a service as injected by the cloud infrastructure provider when the service is up and running and serving client requests, as depicted in FIG. 6.

Figure 7:
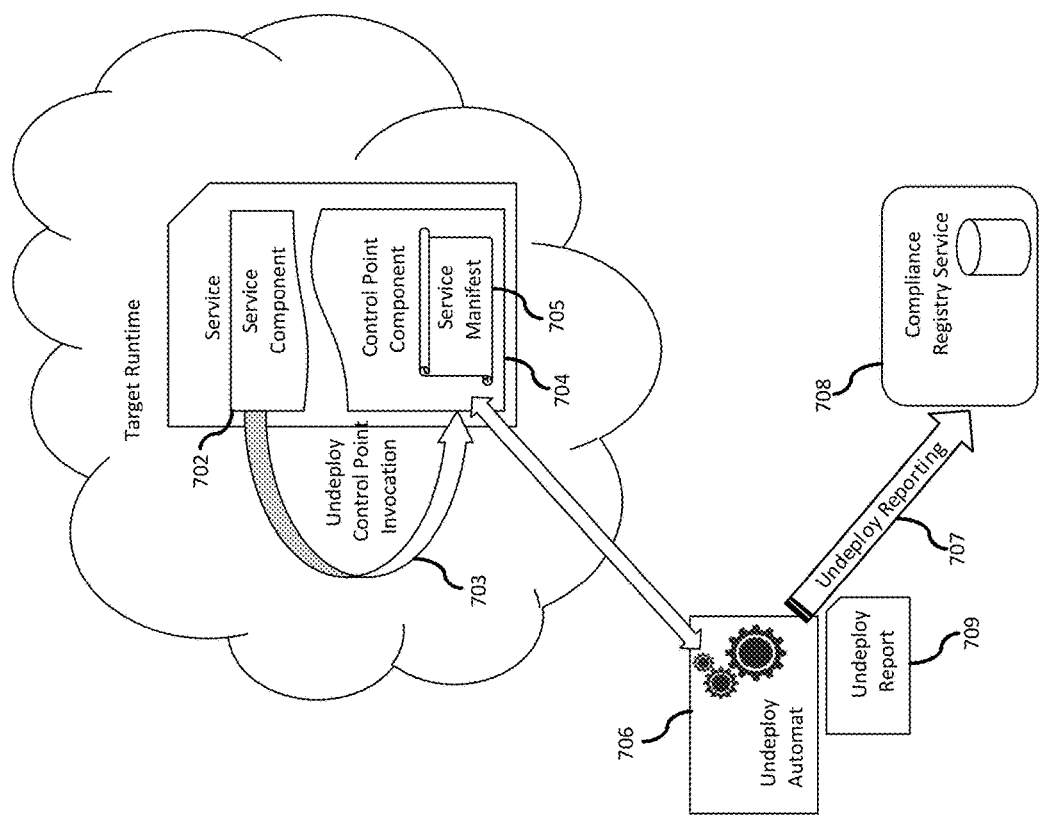
FIG. 7 illustrates a block diagram of the Undeploy Control Point in terms of entities involved in the operation, and a sequence of actions in a typical execution of the control point, according to at least one embodiment.

Service Decommissioning 206 may be a phase when the service is decommissioned by the Control Point Component. According to at least one embodiment, Control Point Component may execute tasks referred to as an Undeploy Control Point. The Undeploy Control Point may describe the actions to be executed by a service as injected by the cloud infrastructure provider when a service is decommissioned from the cloud infrastructure and can no longer be used by clients, as depicted in FIG. 7. According to at least one embodiment, the diagram of FIG. 2 depicts that the Control Points follow a defined order, e.g. the Deploy Control Point cannot be executed without a preceding Validation Control Point.

Figure 3:
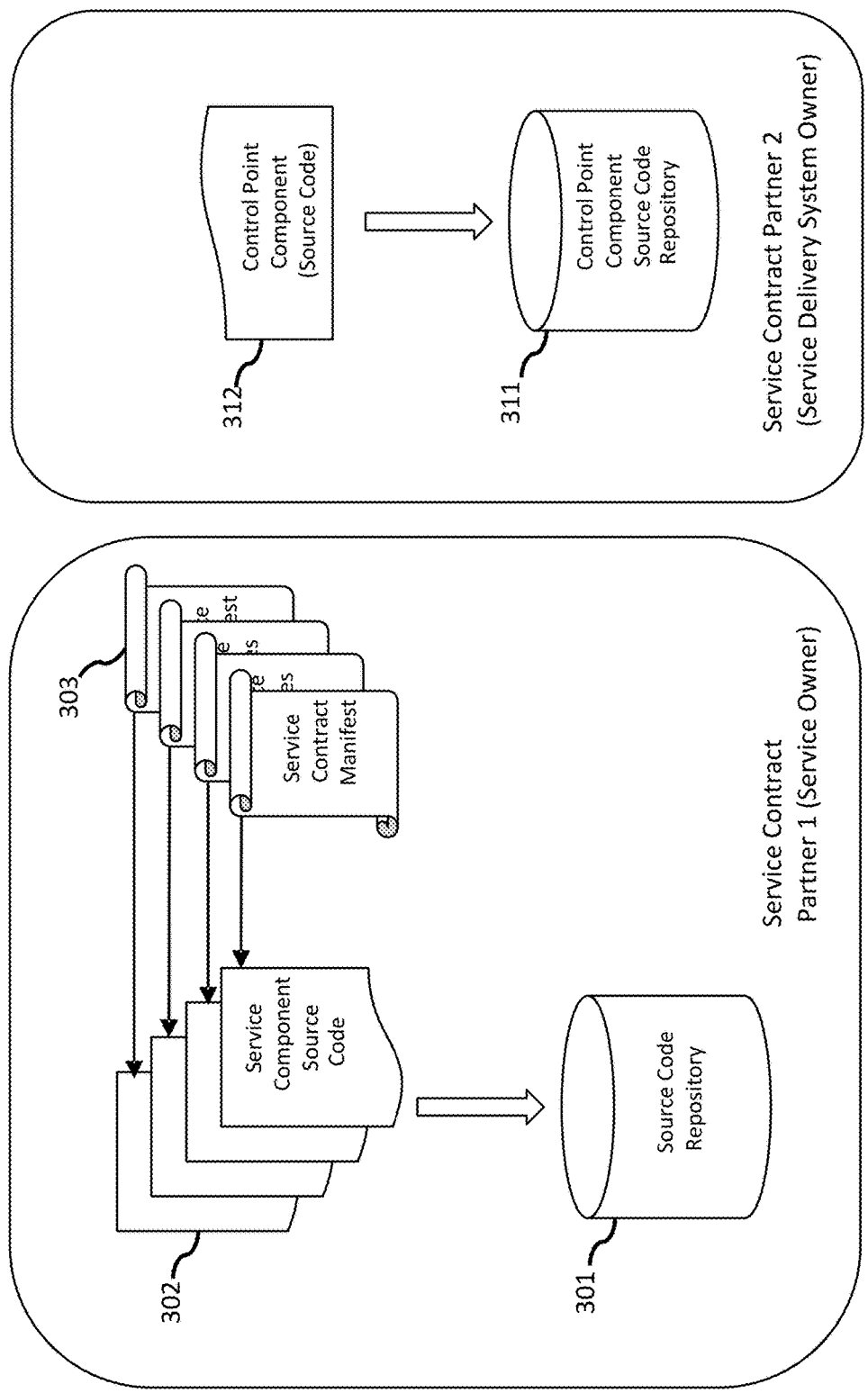
FIG. 3 illustrates a block diagram of the artefacts (documents), source code, and repositories that are involved in the contractual control point according to at least one embodiment.

Referring now to FIG. 3, an exemplary block diagram of the artefacts (documents), source code, and repositories involved in the Contractual Control Point phase are depicted, according to at least one embodiment. According to at least one embodiment, the service owner may complete a Service Contract Manifest 303 with descriptive human-readable information (metadata) about the service. As previously mentioned, the Service Contract Manifest 303 may be an electronic document that serves as an amendment to the Service Contract and documents for each one of the disciplines in IT service compliance that elaborates how the requirements and constraints of the Service Contract are implemented by the associated Service. The human readable information may be required for the cloud infrastructure provider in order to operate and manage the service.

The service owner may add the Service Contract Manifest 303 to the Service Component Source Code 302 and check the Service Contract Manifest 303 into the Source Code Repository 301 of the service. According to at least one embodiment, the Source Code Repository 301 may be a container or data storage which stores source code artefacts and their corresponding versions.

The cloud infrastructure provider may also develop and maintain the Control Point Component (Source Code) 312 and upload the Control Point Component 312 to the associated Control Point Component Source Code Repository 311.

Referring now to FIG. 4, an exemplary block diagram of the Build Control Point in terms of entities involved in the operation, and a sequence of actions in a typical execution of a control point are depicted, according to at least one embodiment. According to at least one embodiment, the Build Automat 407 may retrieve (via consume service component 406) the Service Component Source Code and embedded Service Manifest 403 from the Service Component Source Code Repository 404. Build Automat 407 may be a software component that is invoked when a service build is requested, may execute the transformation of Service Component Source Code 403 and Control Point Component (Source Code) 401 into machine executable binary code, and may upload the machine-executable binary (via upload deployment artefact 411) to the Deployment Artefact Repository 412. Furthermore, Build Automat 407 may execute the transformation of the human-readable information of the Service Contract Manifest 303 into functions (executable program code) and package the human-readable information with the Control Point Component 312.

According to at least one embodiment, consuming service component 406 Build Automat 407 retrieves (via consume control point component 405) the Control Point Component (Source Code) 401 from the Control Point Component Source Code Repository 402, with the advantage that the operators of the service delivery system can inject modified Control Point code with each build of the service without the need to modify the program logic of the targeted service nor the established build automation. According to at least one embodiment, the Build Automat 407 may retrieve from the Service Registry Service 409 the associated Service Manifest (via Read Service Contract Manifests 408), and combines the Service Manifest data with the information from the Service Manifest that the service owner embedded into the Service Component Source Code 403. The advantage of the combination is that the operators of the service delivery system and the provider of the particular service both are able to mutually define and ship updates to the contractual policies defined in the Service Manifest. In at least one embodiment, Build Automat 407 may execute the build steps as depicted in FIG. 9. After executing the build steps, Build Automat 407 may update the registered Service Manifest via Service Registration 410, and may create and write a Build Report 415 to the Compliance Registry Service 413 via build reporting 414. The Build Report 415 may be a document (or data structure) with information about the time, status, and supplementary data of a successful or unsuccessful attempt to execute the Build Control Point. The output of the Build Automat 407 may be a Service Deployment Artefact which is stored via Upload Deployment Artefact 411 process in a Deployment Artefact Repository 412.

Referring now to FIG. 5, an exemplary block diagram of the Deploy Control Point in terms of entities involved in the operation, and a sequence of actions in an execution of the control point are depicted, according to at least one embodiment. At the beginning, Deploy Automat 503 may read the Service Manifest from the Service Registry Service 505 via Read Service Contract Manifests 504 Process. Dependent on the deployment policies defined in the Service Manifest Deploy Automat 503 may execute the following deployment steps. First, Deploy Automat 503 may receive Service Deployment Artefact 520 from the Deployment Artefact Repository 501 via Consume Deployment Artefact 502 process. Second, Deploy Automat 503 may announce the impending deployment to the Compliance Registry Service 507 via Deployment Announcement 506 process. Third, Deploy Automat 503 may deploy the Service Deployment Artefact 520 to the Target Runtime 510 via Service Deployment 508 process. According to at least one embodiment, Target Runtime 510 may be an execution environment running on the Cloud Infrastructure, such as Cloud Platform and Infrastructure 100. In another embodiment, Target Runtime 510 may be a Container or an Application Execution Runtime. Fourth, Target Runtime 510 may start and execute the Service 509. Fifth, Deploy Automat 503 may invoke the deployment control point interface via Deployment Control Point Invocation 513 provided by the Control Point Component 511 that is packaged with Service 509. Sixth, Control Point Component 511 may send via Deployment Reporting 514 the Deploy Report 515 along with the embedded Service Manifest 512 to the Compliance Registry Service 507.

Figure 13:
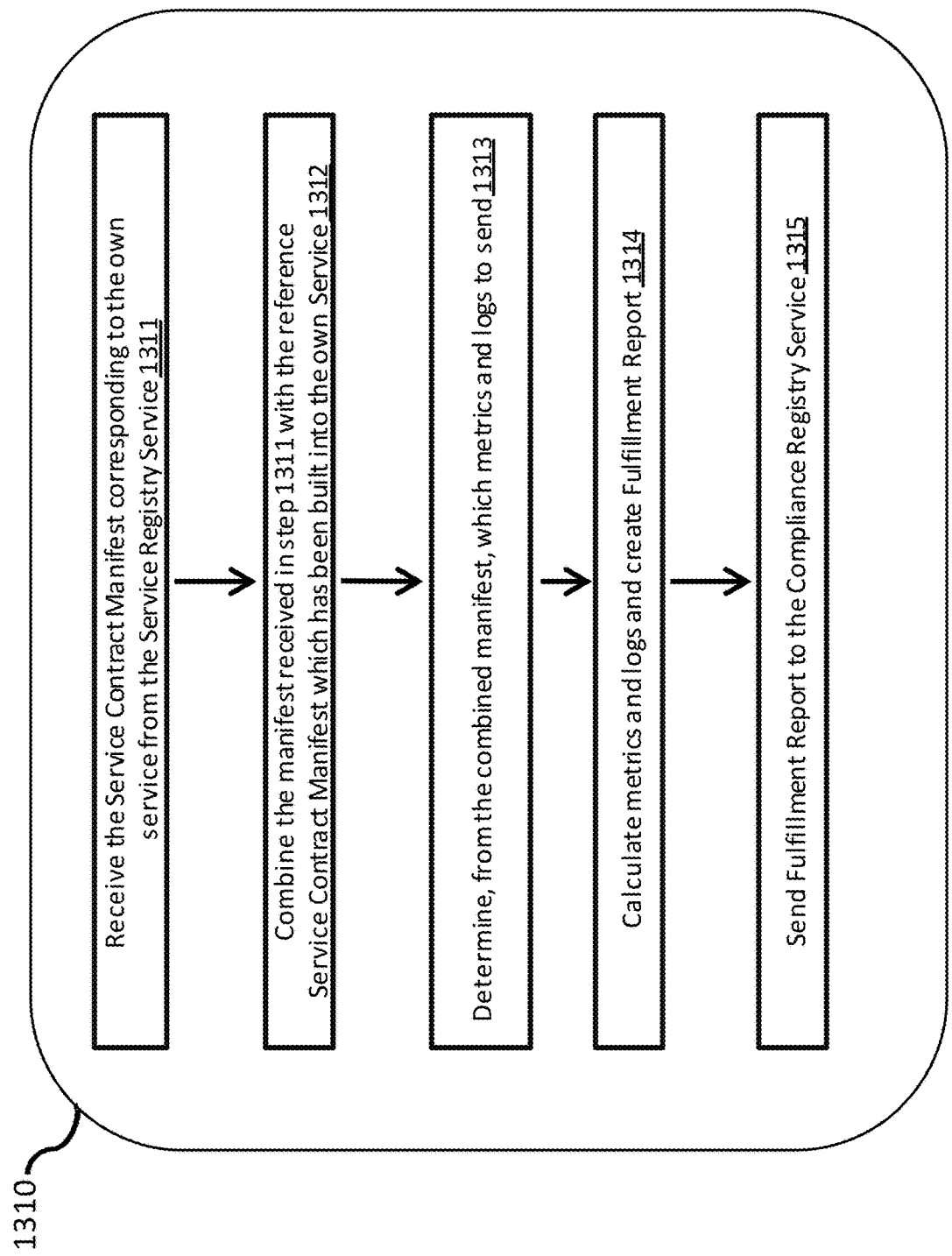
FIG. 13 illustrates a block diagram of the Fulfillment Automat method, according to at least one embodiment.

Referring now to FIG. 6, an exemplary block diagram of the Fulfillment Control Point in terms of entities involved in the operation, and a sequence of actions in an execution of the Service installed and running on the Target Runtime are depicted, according to at least one embodiment. According to at least one embodiment, Service Component 602 executed in Target Runtime 601 may invoke via Fulfillment Control Point Invocation 603 process the Fulfillment Control Point interface offered by the embedded Control Point Component 604. In turn the Control Point Component 604 may invoke its built-in Service Contract Fulfillment Automat 606, which may read and execute the built-in Service Manifest 605 as depicted in FIG. 13. According to at least one embodiment, Service Contract Fulfillment Automat 606 may generate a Health Report 610 and store the Health Report 610 in compliance Registry Service 608 via Compliance Reporting 607 process. The Health Report 610 may be a document (data structure) with information about the time, status, and supplementary data of a successful or unsuccessful attempt to execute the Fulfillment Control Point, such as Fulfillment Control Point Invocation 603 process and may be stored by the Compliance Registry Service 608. According to at least one embodiment, Reporting and Incident Management Service 609 may exchange data with Compliance Registry Service 608. Reporting and Incident Management Service 609 may supervise and monitor the Compliance Registry Service 608 and the Service Registry Service 505 and may take actions which are defined in the Service Contract Manifest in case a non-compliance of the Service with Service Contract obligations is detected.

Figure 12:
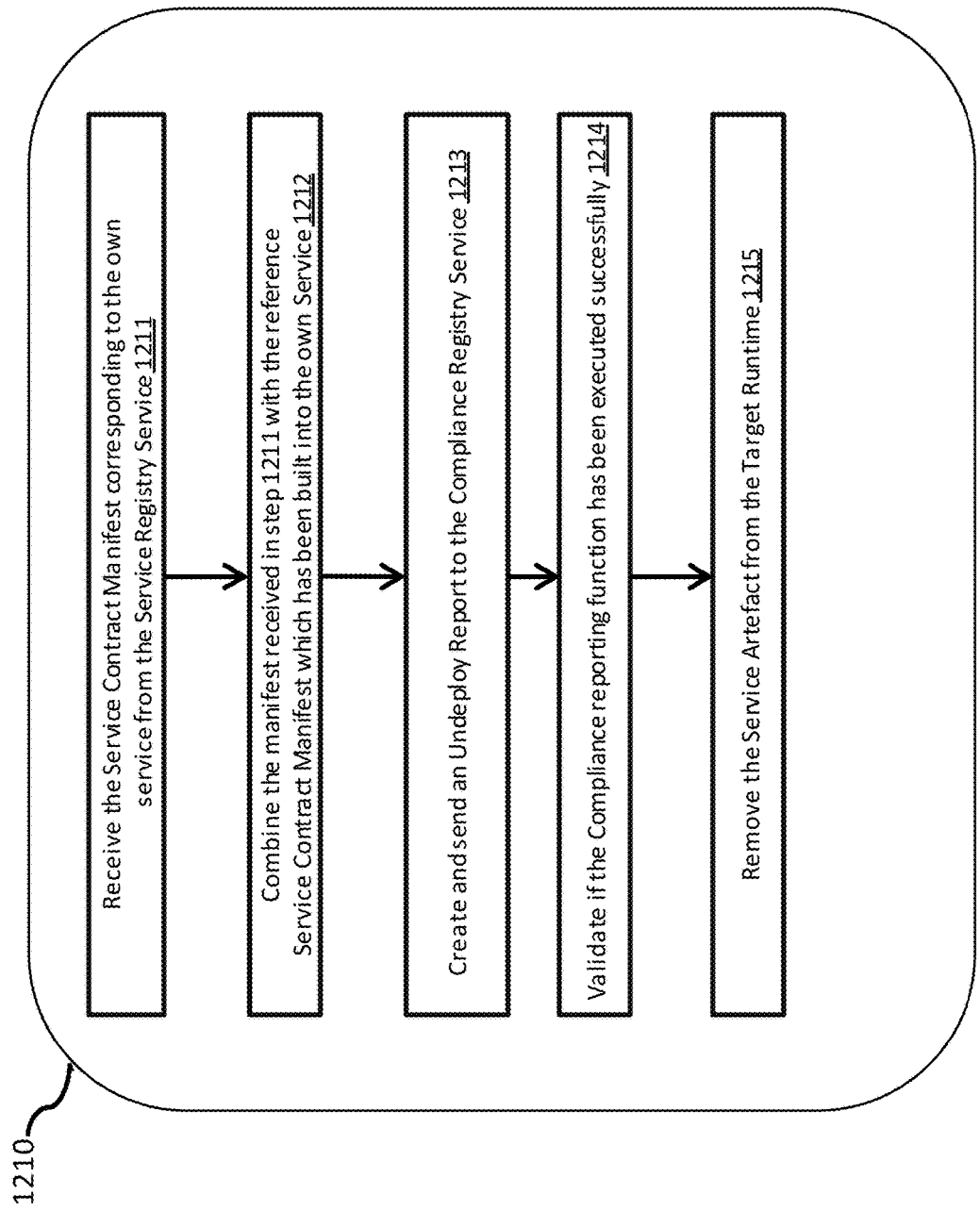
FIG. 12 illustrates a block diagram of the Undeploy Automat method, according to at least one embodiment.

Referring now to FIG. 7, an exemplary block diagram of the Undeploy Control Point in terms of entities involved in the operation, and a sequence of actions in a typical execution of the control point are depicted, according to at least one embodiment. The Service Component 702 may invoke Undeploy Control Point Invocation process 703. An Undeploy Control Point interface may be offered by the embedded Control Point Component 704. In turn the Control Point Component 704 may invoke a built-in Service Contract Undeploy Automat 706, which reads and executes the built-in Service Manifest 705 as depicted in FIG. 12. According to at least one embodiment, Undeploy Automat 706 may generate an Undeploy Report 709 and send the Undeploy Report 709 to Compliance Registry Service 708 via Undeploy Reporting 707 process. Undeploy Report 709 may be a document (data structure) with information about the time, status, and supplementary data of a successful or unsuccessful attempt to execute the Undeploy Control Point, such as Undeploy Control Point Invocation 703 process and may be stored by the Compliance Registry Service 708.

Figure 8:
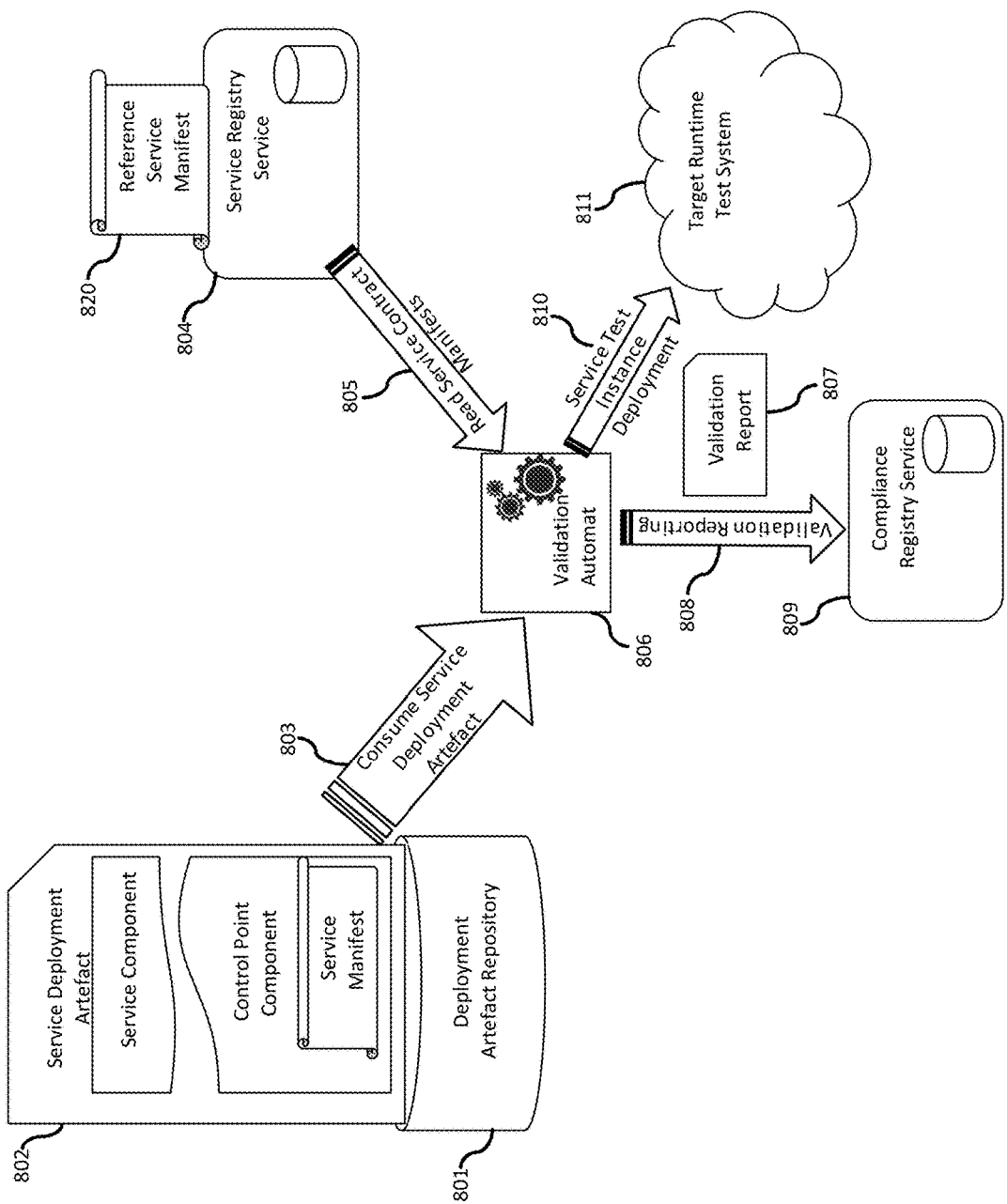
FIG. 8 illustrates a block diagram of the Validation Control Point in terms of entities involved in the operation, and a sequence of actions in an execution of the control point, according to at least one embodiment.

Referring now to FIG. 8, an exemplary block diagram of the Validation Control Point in terms of entities involved in the operation, and a sequence of actions in an execution of the control point are depicted, according to at least one embodiment. According to at least one embodiment, Validation Automat 806 may execute Consume Service Deployment Artefact 803 process and consume Service Deployment Artefact 802 from the Deployment Artefact Repository 801. Next, Validation Automat 806 may execute the Read Service Contract Manifests 805 process and read the Service Manifest 820 from the Service Registry Service 804. Next, Validation Automat 806 may combine both manifests (Service Manifest in Service Deployment Artefact 802 and Reference Service Manifest 820), and determine, from the combined manifest, the steps necessary to successfully validate the Service Deployment Artefact 802. Next, Validation Automat 806 may invoke Service Test Instance Deployment 810 process and deploy a test instance of the Service on the Target Runtime Test System 811. Next, Validation Automat 806 may execute the Validation Reporting 808 process and generate and send 808 the Validation Report 807 to the Compliance Registry Service 809 for storage.

Referring now to FIG. 9, an exemplary data structure of a Service Contract Manifest is depicted, according to at least one embodiment. The Service Contract Manifest 901 may have a data structure that may be advantageously used to document the metadata of a Service in accordance and to the present embodiment. For example, Service Contract Manifest 901 may contain a standardized instruction set to map the requirements and obligations of the Service Contract to policies and fulfillment parameters as defined by the Service owner and may include human-readable information about the Service's build and test infrastructure, source code repositories, information about the service owner and the service owner's operational and support systems as well as operational policies.

Figure 10A:
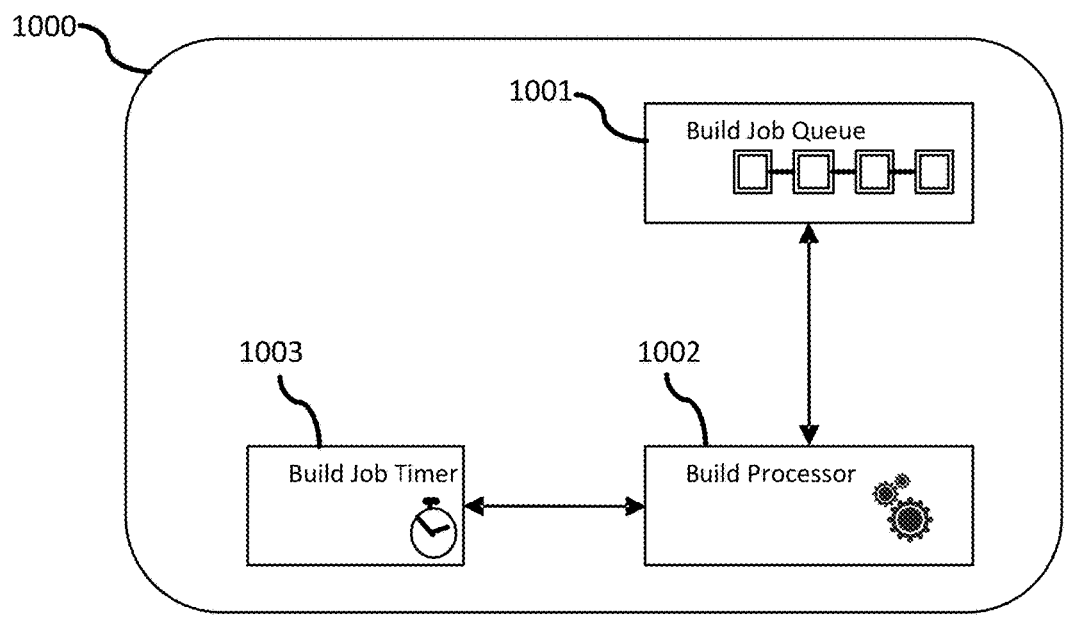
FIG. 10A illustrates a block diagram of the Build Automat, according to at least one embodiment.

Referring now to FIG. 10A, an exemplary block diagram of the Build Automat 1000, is depicted according to at least one embodiment. The Build Automat 1000 is a software component that may include micro-services, such as Build Processor 1002, Build Job Queue 1001 and Build Job Timer 1003. According to at least one embodiment, Build Automat 1000 may execute during the Build Control Point (FIG. 4) two distinct program flows, that is, the Job Registration Flow 1010 (FIG. 10B) and the Build Program Flow 1020 (FIG. 10C). The Build Job Timer 1003 micro-service may implement a configurable monostable (one-shot) trigger that may invoke the Build Processor 1002 micro-service after a configured time. The Build Processor 1002 may execute the Build Program Flow 1020 if a next build job is due (by reading the top element from the Build Job Queue 1001. If no build job is due Build Processor 1002 may execute the Job Registration Flow 1020. Next, after completion Build Processor 1002 may re-initialize Build Job Timer 1003.

Figure 10B:
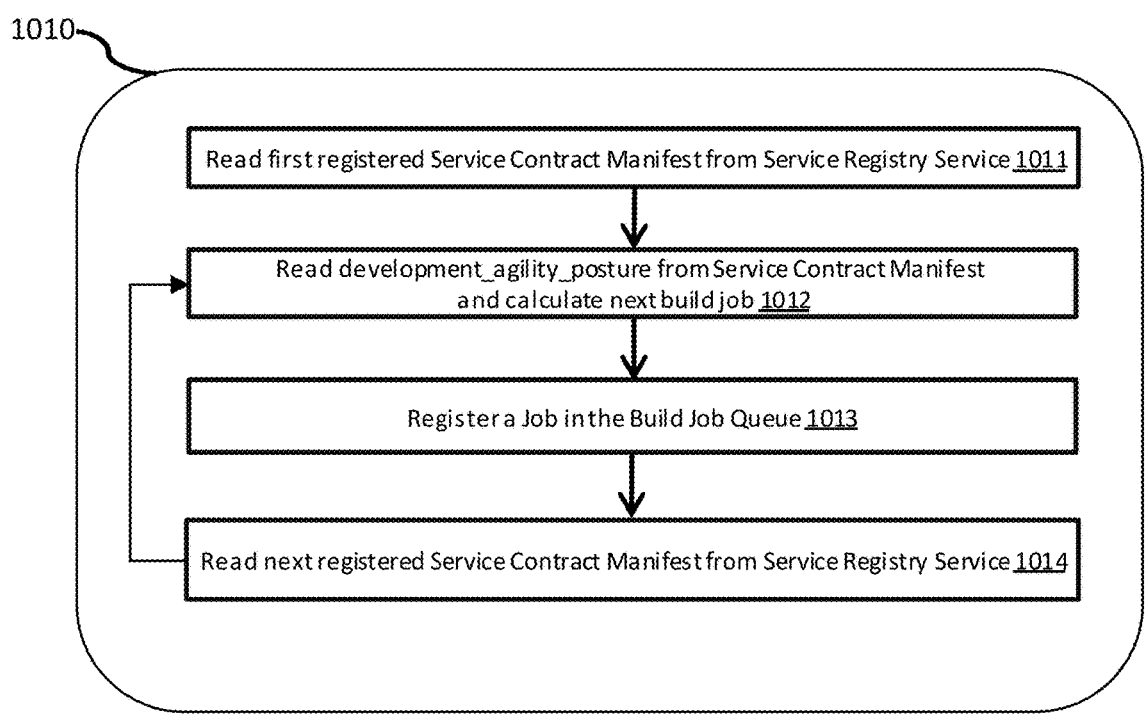
FIG. 10B illustrates a block diagram of the Job Registration Flow, according to at least one embodiment.
Figure 10C:
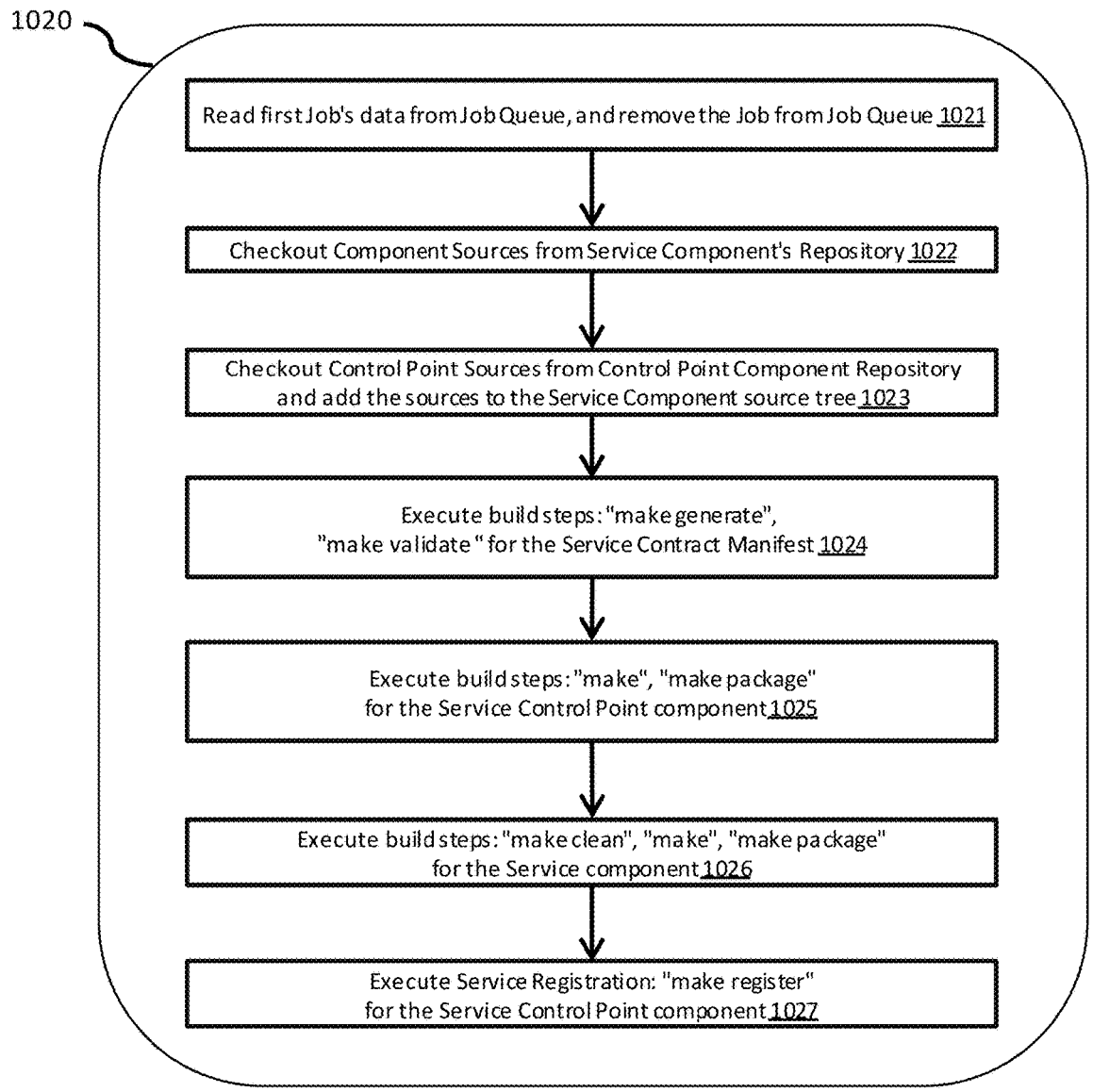
FIG. 10C illustrates a block diagram of the Build Program Flow, according to at least one embodiment.

Referring to FIG. 10B, an exemplary block diagram of the Job Registration Flow is depicted, according to at least one embodiment. At 1011, Build Processor 1002 may read a first registered Service Contract Manifest from Service Registry Service. Next, at 1012, the Build Processor 1002 may read a development agility posture document from the Service Contract Manifest (FIG. 9) and calculate next build job. Then, at 1013, the Build Processor 1002 may register a Job in the Build Job Queue. Next, at 1014, Build Processor 1002 may read a next registered Service Contract Manifest from the Service Registry Service. According to at least one embodiment, if there are no next registered Service Contract Manifests in the Service Registry Service 1014, Build Processor 1002 may terminate the Job Registration Flow 1010.

Referring to FIG. 10C, an exemplary block diagram of the Build Program Flow is depicted, according to at least one embodiment. According to at least one embodiment, Build Processor 1002 may initiate Build Program Flow 1020 by Reading a first Job's data from Job Queue, and remove the Job from the Job Queue. Next, at 1021, Build Processor 1002 may Read first job's data from Build Job Queue 1001 and delete the first job's data from the Build Job Queue 1001. Then, at 1022, the Build Processor 1002 may perform a Checkout of the Component Sources from the Service Component's Repository. Next, at 1023, the Build Processor 1002 may perform a Checkout of the Control Point Sources from Control Point Component Repository and add the sources to the Service Component source tree. Then, at 1024, the Build Processor 1002 may perform executing build steps: "make generate" and "make validate" for the Service Contract Manifest. Next, at 1025, Build Processor 1002 may perform executing build steps: "make" and "make package" for the Service Control Point component 1025. Then, at 1026, the Build Processor 1002 may perform Executing build steps "make clean", "make", and "make package" for the Service component. Next, at 1027, the Build Processor 1002 may perform an Executing Service Registration "make register" for the Service Control Point component 1027.

Figure 11:
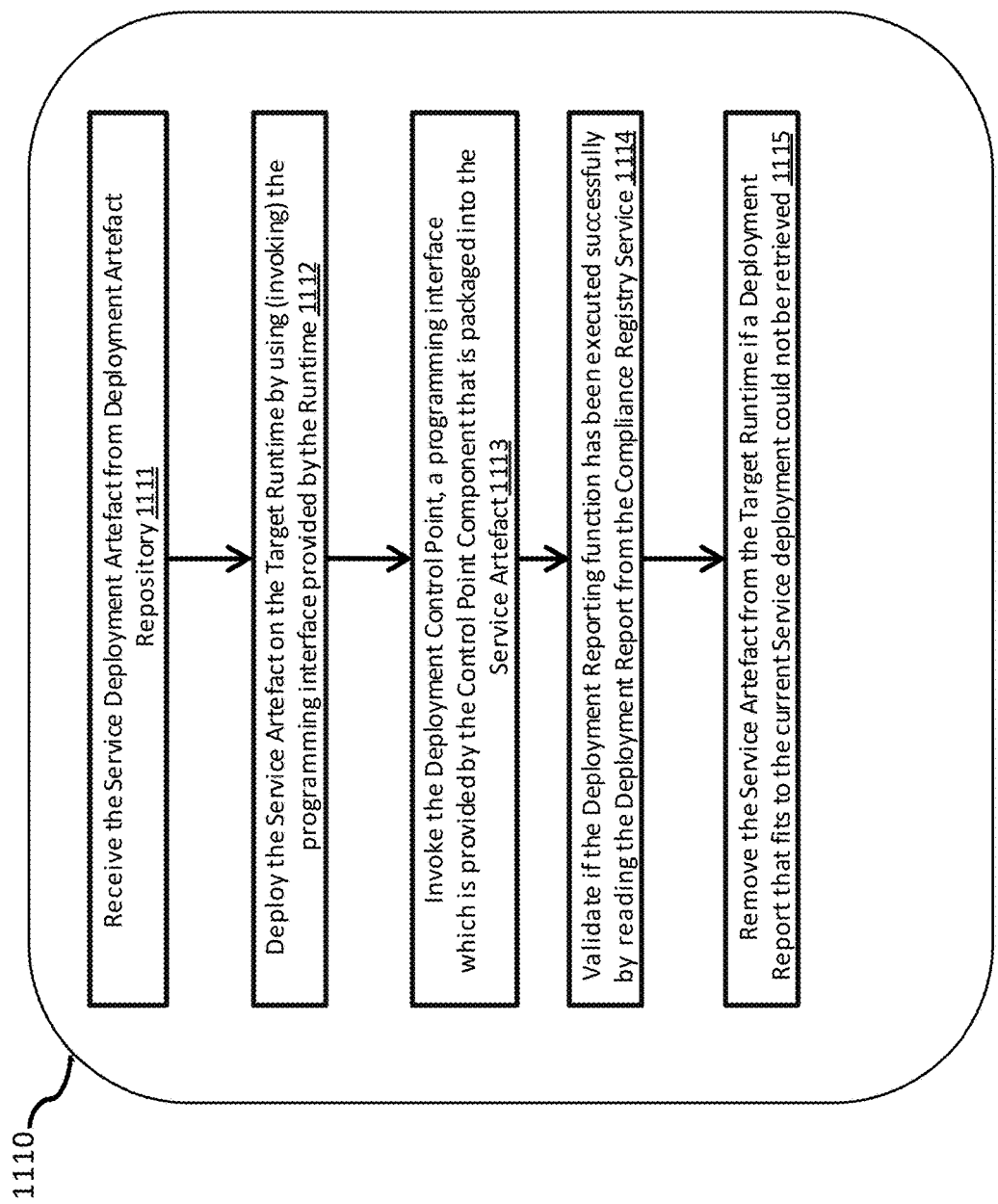
FIG. 11 illustrates a block diagram of the Deploy Automat flow, according to at least one embodiment.

Referring to FIG. 11, an exemplary block diagram of the Deploy Automat flow 1110 is depicted, according to at least one embodiment. According to the current embodiment, at step 1111, the Deploy Automat 503 may receive the Service Deployment Artefact from a Deployment Artefact Repository. Next, at 1112, the Deploy Automat 503 may deploy the Service Artefact on the Target Runtime by using (invoking) the programming interface provided by the Runtime. Then, at 1113, the Deploy Automat 503 May invoke the Deployment Control Point, a programming interface which is provided by the Control Point Component that is packaged into the Service Artefact 1113. Next, at 1114, the Deploy Automat 503 may validate whether the Deployment Reporting function has been executed successfully by reading the Deployment Report from the Compliance Registry Service 1114. Then, at 1115, the Deploy Automat 503 may remove the Service Artefact from the Target Runtime if a Deployment Report that fits to the current Service deployment could not be retrieved.

Referring now to FIG. 12, an exemplary block diagram of the Undeploy Automat method 1210 is depicted, according to at least one embodiment. At step 1211, the Undeploy Automat 706 may receive the Service Contract Manifest corresponding to service owner from the Service Registry Service. Next, at 1211, the Undeploy Automat 706 may combine the manifest received in step 1211 with the reference Service Contract Manifest which has been built into the Service. Then, at 1213, the Undeploy Automat 706 may create and send an Undeploy Report to the Compliance Registry Service. Next, at 1214, the Undeploy Automat 706 may validate if the Compliance reporting function has been executed successfully. Then, at 1215, the Undeploy Automat 706 may remove the Service Artefact from the Target Runtime. After removal of the Service Artefact from the Target Runtime, the Undeploy Automat 706 may terminate the Undeploy Automat method 1210.

Referring now to FIG. 13, an exemplary diagram of the Fulfillment Automat method 1310 is depicted, according to at least one embodiment. At 1311, the Fulfillment Automat 606 may receive the Service Contract Manifest corresponding to the own service from the Service Registry Service. Then, at 1312, the Fulfillment Automat 606 may combine the manifest received in step 1311 with the reference Service Contract Manifest that has been built into the Service 1312. Next, at 1313, the Fulfillment Automat 606 may determine, from the combined manifest, which metrics and logs to send. Then, at 1314, the Fulfillment Automat 606 may calculate metrics and logs and create a Fulfillment Report. Next, at 1315, the Fulfillment Automat 606 may send a Fulfillment Report to the Compliance Registry Service. After sending Fulfillment Report to the Compliance Registry Service, the Fulfillment Automat 606 may terminate the Fulfillment Automat method 1310.

Figure 14:
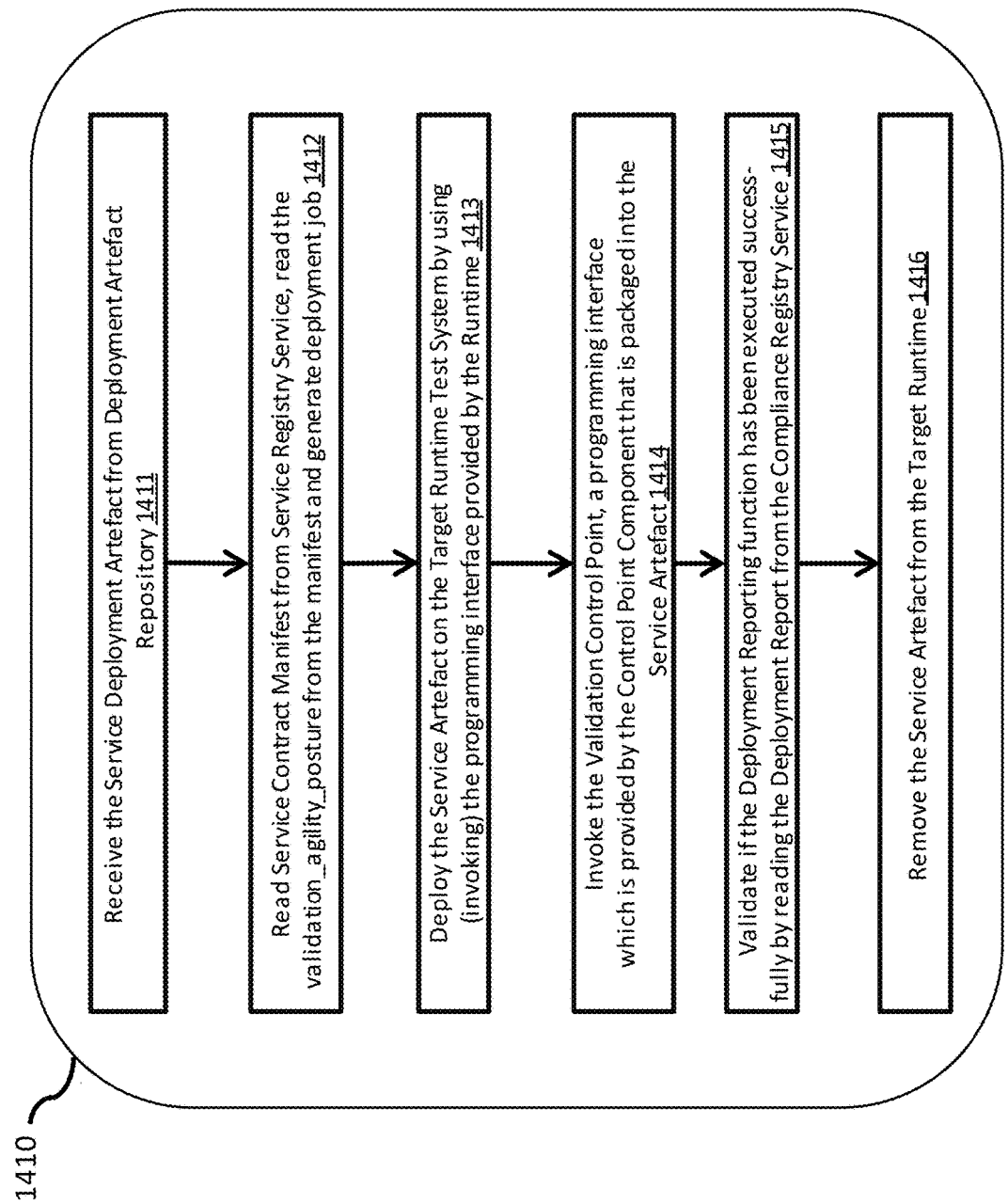
FIG. 14 illustrates a block diagram of the Validation Automat method, according to at least one embodiment.

Referring now to FIG. 14, an exemplary block diagram of the Validation Automat method 1410 is depicted, according to at least one embodiment. At 1411, the Validation Automat 806 may receive the Service Deployment Artefact from Deployment Artefact Repository. Next, at 1412, the Validation Automat 806 may read the Service Contract Manifest from the Service Registry Service and the validation_agility_posture from the manifest and generate the deployment job. Then, at 1413, the Validation Automat 806 may deploy the Service Artefact on the Target Runtime Test System by using (invoking) the programming interface provided by the Runtime. Next, at 1414, the Validation Automat 806 may invoke the Validation Control Point, a programming interface which is provided by the Control Point Component that is packaged into the Service Artefact. Then, at 1415, the Validation Automat 806 may validate whether the Deployment Reporting function has been executed successfully by reading the Deployment Report from the Compliance Registry Service. Next, at 1416, the Validation Automat 806 may remove the Service Artefact from the Target Runtime. After Remove the Service Artefact from the Target Runtime, the Validation Automat 806 may terminate the Validation Automat method 1410.

It should be appreciated that FIGS. 10B-14 provide only an illustration of one implementation and does not imply any limitations with regard to the environments in which different embodiments may be implemented. Many modifications to the depicted environments may be made based on design and implementation requirements.

Figure 15:
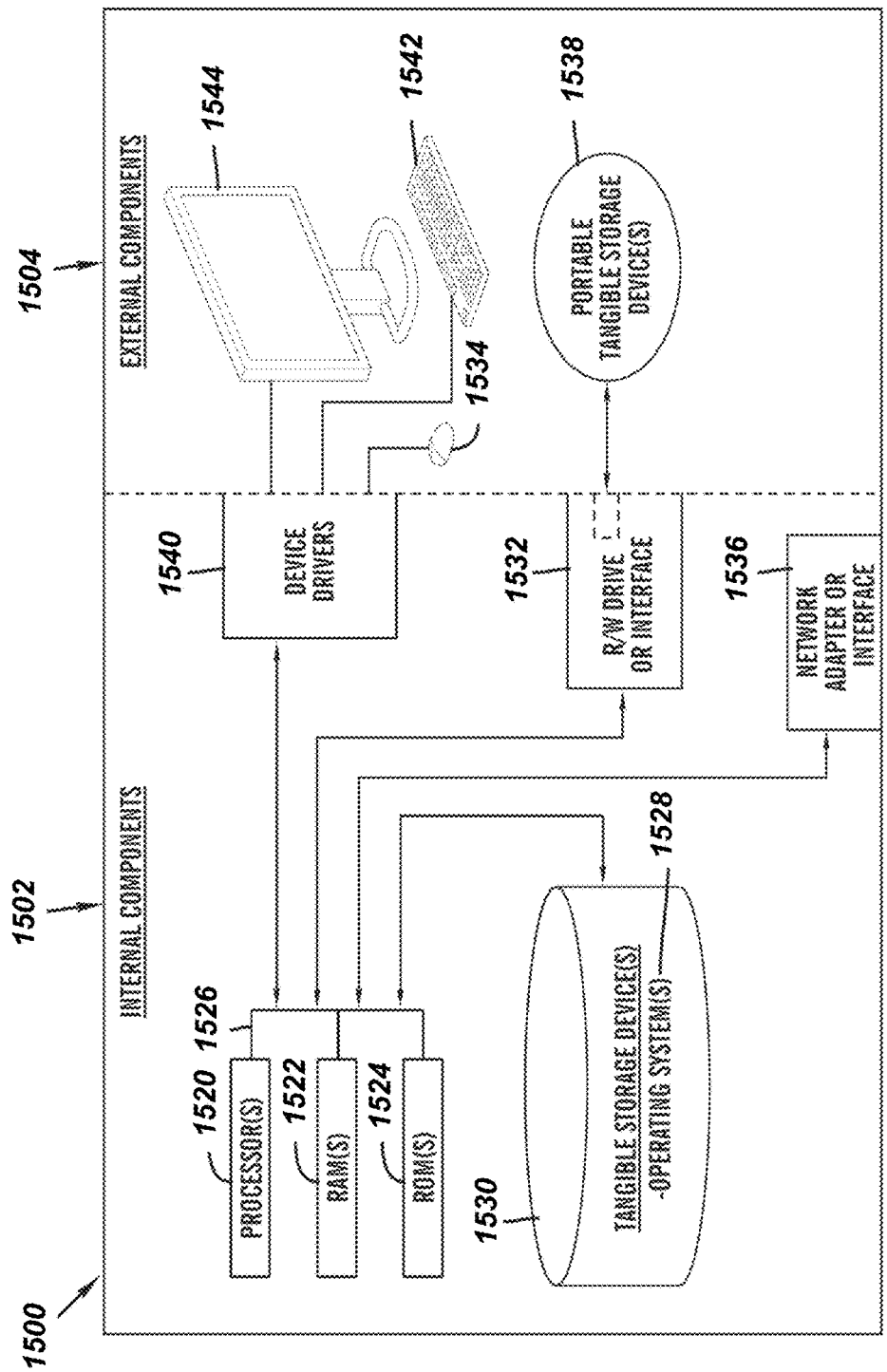
FIG. 15 is a block diagram of internal and external components of Cloud Platform and Infrastructure depicted in FIG. 1 according to at least one embodiment.

Referring now to FIG. 15, the data processing system 1502, 1504 is representative of any electronic device capable of executing machine-readable program instructions. The data processing system 1502, 1504 may be representative of a smart phone, a computer system, PDA, or other electronic devices. Examples of computing systems, environments, and/or configurations that may represented by the data processing system 1502, 1504 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The Cloud Platform and Infrastructure 100 may include respective sets of internal components 1502a,b and external components 1504a,b illustrated in FIG. 15. Each of the sets of internal components 1502 include one or more processors 1520, one or more computer-readable RAMs 1522, and one or more computer-readable ROMs 1524 on one or more buses 1526, and one or more operating systems 1528 and one or more computer-readable tangible storage devices 1530. The one or more operating systems 1528, Build Automat 407, Deploy Automat 503, Service Contract Fulfillment Automat 606, Undeploy Automat 706, Validation Automat 806, and all the included micro-services in the Cloud Platform and Infrastructure 100 are stored on one or more of the respective computer-readable tangible storage devices 1530 for execution by one or more of the respective processors 320 via one or more of the respective RAMs 1522 (which typically include cache memory). In the embodiment illustrated in FIG. 15, each of the computer-readable tangible storage devices 1530 is a magnetic disk storage device of an internal hard drive. Alternatively, each of the computer-readable tangible storage devices 1530 is a semiconductor storage device such as ROM 1524, EPROM, flash memory or any other computer-readable tangible storage device that can store a computer program and digital information.

Each set of internal components 1502*a,b* also includes a R/W drive or interface 1532 to read from and write to one or more portable computer-readable tangible storage devices 1538 such as a CD-ROM, DVD, memory stick, magnetic tape, magnetic disk, optical disk or semiconductor storage device. A software program, such as Build Automat 407, Deploy Automat 503, Service Contract Fulfillment Automat 606, Undeploy Automat 706, Validation Automat 806, and all the included micro-services, can be stored on one or more of the respective portable computer-readable tangible storage devices 1538, read via the respective R/W drive or interface 1532, and loaded into the respective hard drive 1530.

Each set of internal components 1502*a,b* also includes network adapters or interfaces 1536 such as a TCP/IP adapter cards, wireless Wi-Fi interface cards, or 3G or 4G wireless interface cards or other wired or wireless communication links. The Build Automat 407, Deploy Automat 503, Service Contract Fulfillment Automat 606, Undeploy Automat 706, Validation Automat 806, and all the included micro-services in the Cloud Platform and Infrastructure 100 can be downloaded to the Cloud Platform and Infrastructure 100 from an external computer via a network (for example, the Internet, a local area network or other, wide area network) and respective network adapters or interfaces 1536. From the network adapters or interfaces 1536, the Build Automat 407, Deploy Automat 503, Service Contract Fulfillment Automat 606, Undeploy Automat 706, Validation Automat 806, and all the included micro-services in the Cloud Platform and Infrastructure 100 are loaded into the respective hard drive 1530. The network may comprise copper wires, optical fibers, wireless transmission, routers, firewalls, switches, gateway computers and/or edge servers.

Each of the sets of external components 1504*a,b* can include a computer display monitor 1544, a keyboard 1542, and a computer mouse 1534. External components 1504*a,b* can also include touch screens, virtual keyboards, touch pads, pointing devices, and other human interface devices. Each of the sets of internal components 1502*a,b* also includes device drivers 1540 to interface to computer display monitor 1544, keyboard 1542, and computer mouse 1534. The device drivers 1540, R/W drive or interface 1532, and network adapter or interface 1536 comprise hardware and software (stored in storage device 1530 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 16:
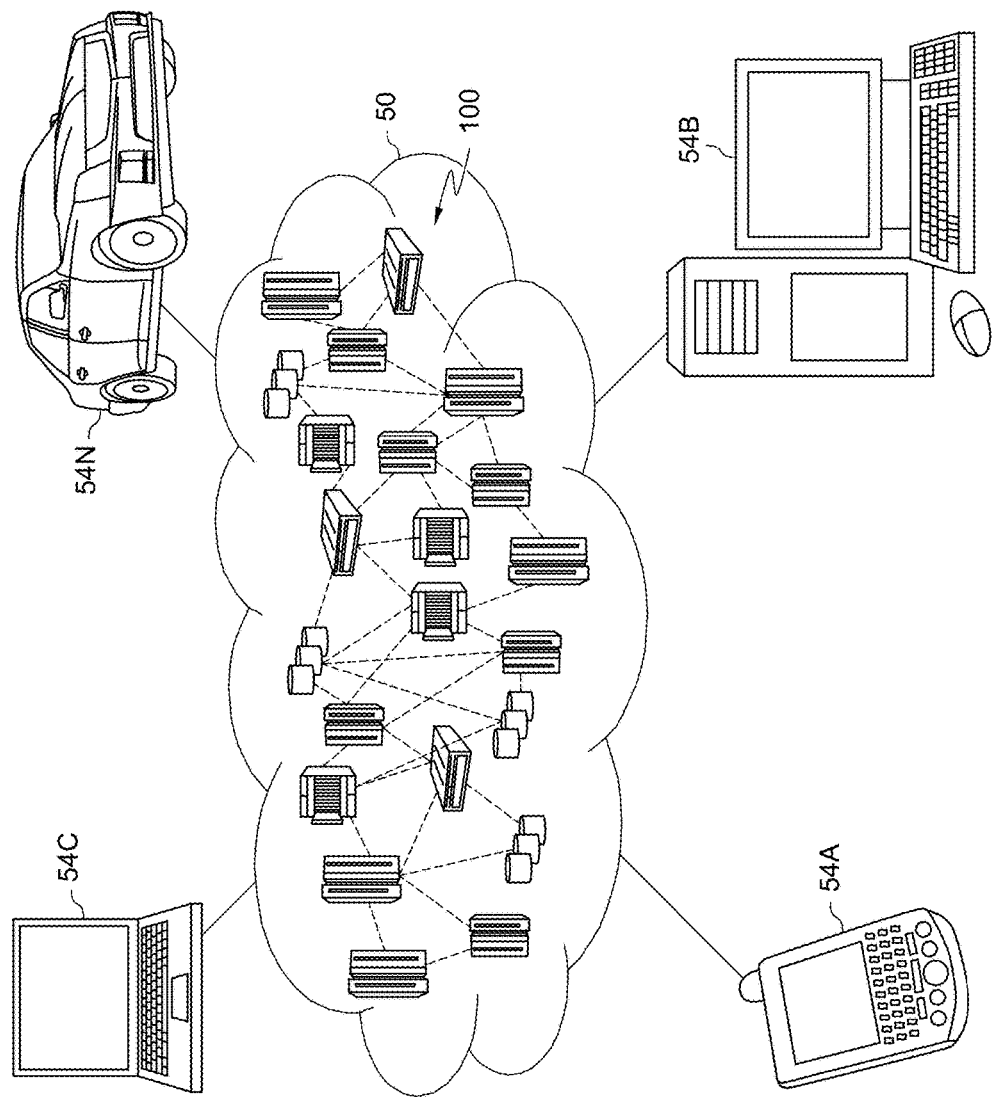
FIG. 16 depicts a cloud computing environment according to an embodiment of the present invention.

Referring now to FIG. 16, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 100 and cloud computing environment 50 can communicate with any type of computerized device over any type of network and/or network addressable connection (e.g., using a web browser).

Figure 17:
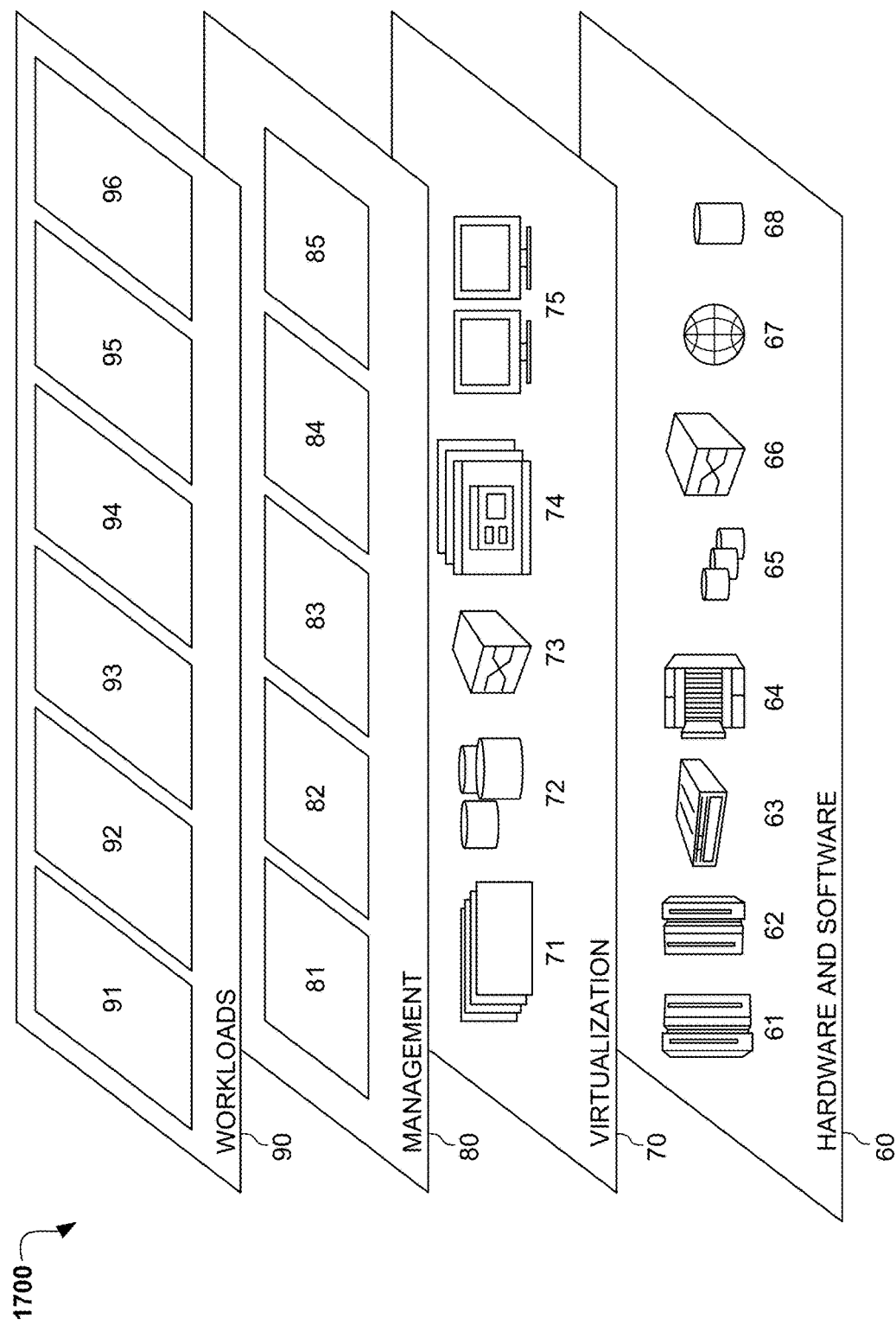
FIG. 17 depicts abstraction model layers according to an embodiment of the present invention.

Referring now to FIG. 17, a set of functional abstraction layers 1700 provided by cloud computing environment 50 is shown. It should be understood in advance that the components, layers, and functions shown in FIG. 17 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and managing the compliance of cloud services 96. Managing the compliance of cloud services 96 may relate to a software method of automatic orchestration of the compliance of cloud services to selected standards and policies via Build Automat 407, Deploy Automat 503, Service Contract Fulfillment Automat 606, Undeploy Automat 706, Validation Automat 806, and all the included micro-services in the Cloud Platform and Infrastructure 100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for enhancing a service delivery system of a cloud infrastructure provider with a compliance management system, the method comprising:
    extracting a plurality of metadata from a service contract, wherein the service contract is a mutually agreed upon human-readable document between the cloud infrastructure provider and a service owner, and wherein a service of the service owner is deployed on the service delivery system of the cloud infrastructure provider according to the service contract;
    compiling the extracted plurality of metadata into a control component, wherein the control component is an executable program that is compiled as an integrated part of the service and adopted for auditing and enforcing the service contract;

causing the service owner to compile the service with the control component, the control component auditing and enforcing the service contract of the service; and monitoring the service at runtime for compliance with the service contract.

2. The method of claim 1, wherein the control component further comprises:

a contractual control point component, wherein the contractual control point component is compiled during introduction of the service;

a build control point component, wherein the build control point component is added to the service during introduction of the service;

a validation control point component, wherein the validation control point is activated during validation that the service is in compliance with the service contract;

a deploy control point component, wherein the deploy control component is activated during service deployment on the service delivery system;

a fulfillment control point component, wherein the fulfillment control point component is activated during operation of the service on the service delivery system; and an undeploy control point component, wherein the undeploy control point component is activated during decommissioning of the service.

3. The method of claim 1, wherein monitoring the service at runtime for compliance with the service contract further comprises:

reporting by a reporting incident and a management service of the cloud infrastructure provider based on a non-compliance of the service to the service contract; and taking one or more actions defined in the service contract based on the non-compliance.

4. The method of claim 1, wherein compiling the plurality of metadata into a control component further comprises:

receiving, by a build automat, a plurality of service component source code, wherein the plurality of service component source code corresponds to the plurality of metadata from the service contract;

receiving a control point component, wherein the control point component is provided by the cloud infrastructure provider;

compiling, by the build automat, the control component and the service component source code; and and uploading a build report and a deployment artefact, wherein the deployment artefact is an executable file or a library that is installed on the service delivery system.

5. The method of claim 4, wherein the build automat comprises:

a build job queue;

a build job timer; and a build processor.

6. The method of claim 4, wherein the build report is uploaded to a compliance registry service, and wherein the build report is a document comprising: a time, a status, and a supplementary data of a successful or unsuccessful attempt to execute the compiling of the metadata into the control component.

7. The method of claim 5, wherein the build processor is a micro-service that initiates a job registration flow and a build registration flow, wherein the job registration flow is managing the build job queue and the build registration flow compiles the service.

8. A computer system for enhancing a service delivery system of a cloud infrastructure provider with a compliance management system, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system performs a method comprising:

extracting a plurality of metadata from a service contract, wherein the service contract is a mutually agreed upon human-readable document between the cloud infrastructure provider and a service owner, and wherein a service of the service owner is deployed on the service delivery system of the cloud infrastructure provider according to the service contract;

compiling the extracted plurality of metadata into a control component, wherein the control component is an executable program that is compiled as an integrated part of the service and adopted for auditing and enforcing the service contract;

causing the service owner to compile the service with the control component, wherein the control component auditing and enforcing the service contract of the service; and monitoring the service at runtime for compliance with the service contract.

9. The computer system of claim 8, wherein the control component further comprises:

a contractual control point component, wherein the contractual control point component is compiled during introduction of the service;

a build control point component, wherein the build control point component is added to the service during introduction of the service;

a validation control point component, wherein the validation control point is activated during validation that the service is in compliance with the service contract;

a deploy control point component, wherein the deploy control component is activated during service deployment on the service delivery system;

a fulfillment control point component, wherein the fulfillment control point component is activated during operation of the service on the service delivery system; and an undeploy control point component, wherein the undeploy control point component is activated during decommissioning of the service.

10. The computer system of claim 8, wherein monitoring the service at runtime for compliance with the service contract further comprises:

reporting by a reporting incident and a management service of the cloud infrastructure provider based on a non-compliance of the service to the service contract; and taking one or more actions defined in the service contract based on the non-compliance.

11. The computer system of claim 8, wherein compiling the plurality of metadata into a control component further comprises:

receiving, by a build automat, a plurality of service component source code, wherein the plurality of service component source code corresponds to the plurality of metadata from the service contract;

receiving a control point component, wherein the control point component is provided by the cloud infrastructure provider;

compiling, by the build automat, the control component and the service component source code; and uploading a build report and a deployment artefact, wherein the deployment artefact is an executable file or a library that is installed on the service delivery system.

12. The computer system of claim 11, wherein the build automat comprises:
a build job queue;
a build job timer; and
a build processor.

13. The computer system of claim 11, wherein the build report is uploaded to a compliance registry service, and wherein the build report is a document comprising: a time, a status, and a supplementary data of a successful or unsuccessful attempt to execute the compiling of the metadata into the control component.

14. The computer system of claim 12, wherein the build processor is a micro-service that initiates a job registration flow and a build registration flow, wherein the job registration flow is managing the build job queue and the build registration flow compiles the service.

15. A computer program product for enhancing a service delivery system of a cloud infrastructure provider with a compliance management system, the computer program product comprising:
one or more computer-readable tangible storage medium and program instructions stored on at least one of the one or more tangible storage medium, the program instructions executable by a processor, the program instructions comprising:
program instructions to extract a plurality of metadata from a service contract, wherein the service contract is a mutually agreed upon human-readable document between the cloud infrastructure provider and a service owner, and wherein a service of the service owner is deployed on the service delivery system of the cloud infrastructure provider according to the service contract;
program instructions to compile the extracted plurality of metadata into a control component, wherein the control component is an executable program that is compiled as an integrated part of the service and adopted for auditing and enforcing the service contract;
program instructions to cause the service owner to compile the service with the control component, wherein the control component auditing and enforcing the service contract of the service; and
program instructions to monitor the service at runtime for compliance with the service contract.

16. The computer program product of claim 15, wherein the control component further comprises:

a contractual control point component, wherein the contractual control point component is compiled during introduction of the service;
a build control point component, wherein the build control point component is added to the service during introduction of the service;
a validation control point component, wherein the validation control point is activated during validation that the service is in compliance with the service contract;
a deploy control point component, wherein the deploy control component is activated during service deployment on the service delivery system;
a fulfillment control point component, wherein the fulfillment control point component is activated during operation of the service on the service delivery system; and
an undeploy control point component, wherein the undeploy control point component is activated during decommissioning of the service.

17. The computer program product of claim 15, wherein program instructions to monitor the service at runtime for compliance with the service contract further comprises:
program instructions to report by a reporting incident and a management service of the cloud infrastructure provider based on a non-compliance of the service to the service contract; and
program instructions to take one or more actions defined in the service contract based on the non-compliance.

18. The computer program product of claim 15, wherein program instructions to compile the plurality of metadata into a control component further comprises:
program instructions to receive, by a build automat, a plurality of service component source code, wherein the plurality of service component source code corresponds to the plurality of metadata from the service contract;
program instructions to receive a control point component, wherein the control point component is provided by the cloud infrastructure provider;
program instructions to compile, by the build automat, the control component and the service component source code; and
program instructions to upload a build report and a deployment artefact, wherein the deployment artefact is an executable file or a library that is installed on the service delivery system.

19. The computer program product of claim 18, wherein the build automat comprises:
a build job queue;
a build job timer; and
a build processor.

20. The computer program product of claim 18, wherein the build report is uploaded to a compliance registry service, and wherein the build report is a document comprising: a time, a status, and a supplementary data of a successful or unsuccessful attempt to execute the compiling of the metadata into the control component.

* * * * *